United States Patent [19]
Arai et al.

[11] Patent Number: 5,907,545
[45] Date of Patent: May 25, 1999

[54] WIRELESS COMMUNICATION APPARATUS AND METHOD

[76] Inventors: Yasuyuki Arai, 1-4-13-402, Kajigaya, Takatsu-ku, Kawasaki-shi, Kanagawa-ken, Japan; Michihiro Izumi, c/o Canon Kabushiki Kaisha, 30-2, Shimomaruko 3-chome, Ohta-ku, Tokyo, Japan

[21] Appl. No.: 08/773,887

[22] Filed: Dec. 27, 1996

[30] Foreign Application Priority Data

Jan. 16, 1996 [JP] Japan .................................. 8-004894
Jan. 16, 1996 [JP] Japan .................................. 8-004895

[51] Int. Cl.$^6$ .................................................. H04B 7/216
[52] U.S. Cl. ......................... 370/342; 370/335; 375/202
[58] Field of Search ................................ 375/200, 202; 370/319, 320, 321, 330, 335, 436, 336, 342, 441, 479; 455/447, 450

[56] References Cited

U.S. PATENT DOCUMENTS

| | | |
|---|---|---|
| 5,257,398 | 10/1993 | Schaeffer .............................. 455/452 |
| 5,319,798 | 6/1994 | Watanabe .................................. 455/76 |
| 5,381,443 | 1/1995 | Borth et al. ............................. 375/202 |
| 5,408,496 | 4/1995 | Ritz et al. ............................... 375/202 |
| 5,483,550 | 1/1996 | Hulbert ..................................... 375/202 |
| 5,506,863 | 4/1996 | Meidan et al. .......................... 375/202 |
| 5,586,120 | 12/1996 | Cadd ....................................... 370/468 |

*Primary Examiner*—Chau Nguyen
*Assistant Examiner*—Soon-Dong Hyun
*Attorney, Agent, or Firm*—Fitzpatrick, Cella, Harper & Scinto

[57] ABSTRACT

A communication apparatus time-division multiplexes a plurality of items of information which include control information and at least one item of communication information, and allocates a plurality of hopping patters for each of the plurality of items of information. Frequency is changed over for each item of information in accordance with the plurality of hopping patterns, which have been stored for each communication, and communication is carried out using the frequency to which the changeover has been made.

15 Claims, 27 Drawing Sheets

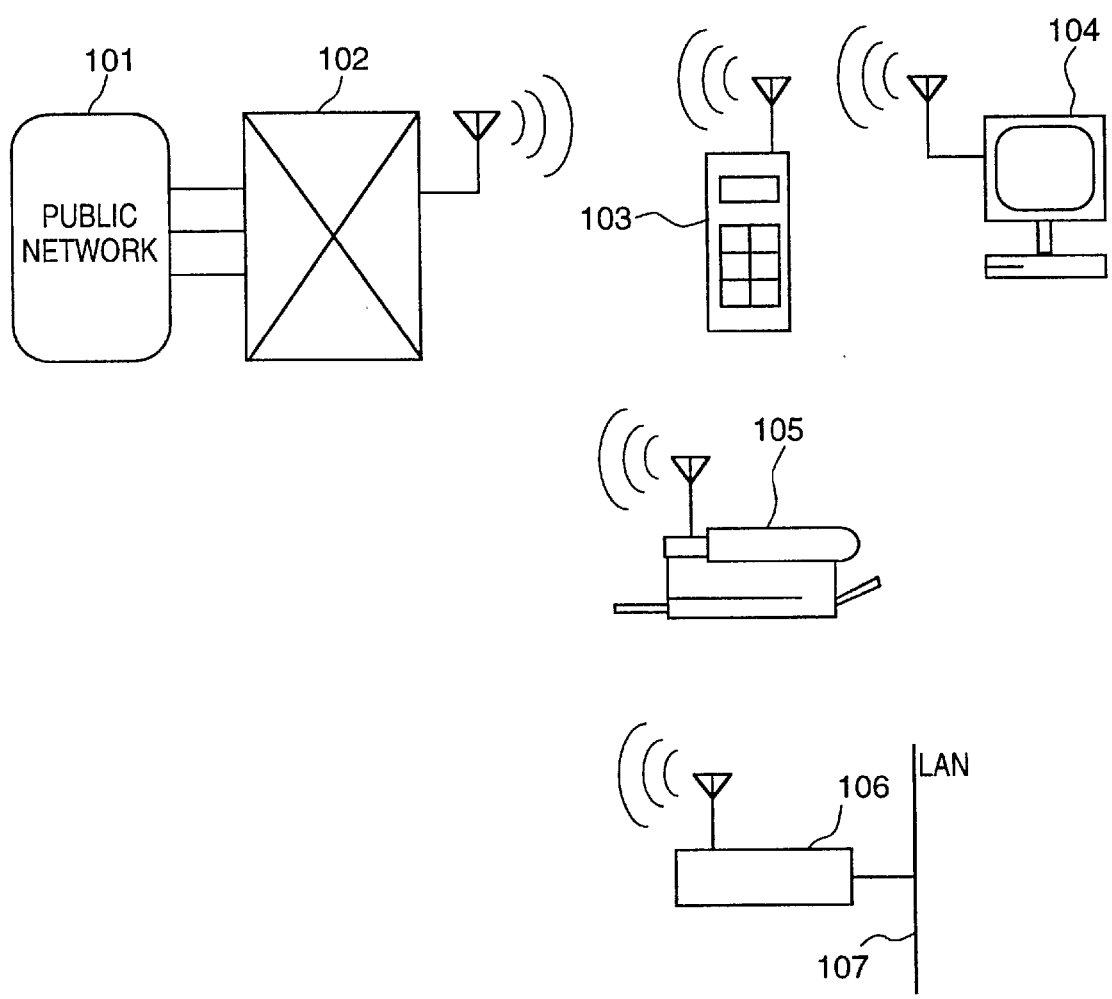
F I G. 1

FIG. 6A

SYSTEM CONTROL CHANNEL (CNT)

| CS | PR | SYN | ID | BF | WA | NF | Rev | CRC | GT |
|---|---|---|---|---|---|---|---|---|---|
| 8 | 56 | 32 | 64 | 8 | 8 | 8 | 8 | 16 | 33 |

FIG. 6B

LINE CONTROL CHANNEL (LCCH)

| CS0 | CS1 | CS2 | PR | UW | DA | DATA | CRC | CF |
|---|---|---|---|---|---|---|---|---|
| 8 | 8 | 8 | 56 | 24 | 8 | 128 | 16 | 80 |

FIG. 6C

DATA CHANNEL

| CF | CS0 | CS1 | CS2 | PR | UW | DA | DATA | GT |
|---|---|---|---|---|---|---|---|---|
| 80 | 8 | 8 | 8 | 56 | 24 | 8 | 4416 | 68 |

FIG. 6D

VOICE CHANNEL

| CS | PR | UW | T/R | CRC | GT |
|---|---|---|---|---|---|
| 8 | 56 | 24 | 320 | 16 | 32 |

F I G. 20
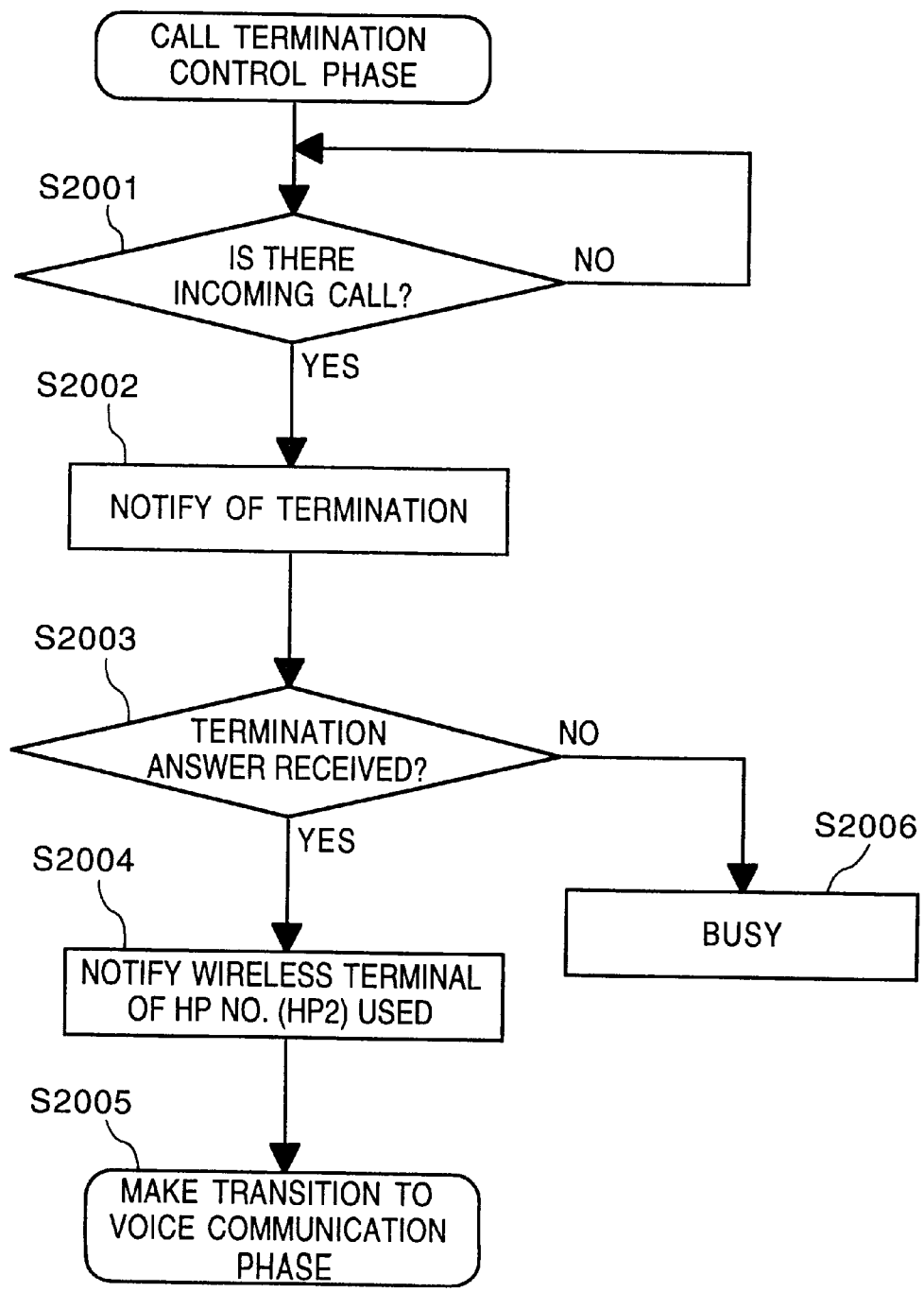

WIRELESS COMMUNICATION APPARATUS AND METHOD

BACKGROUND OF THE INVENTION

This invention relates to a wireless communication apparatus and method that employ frequency hopping.

In a frequency hopping spread spectrum (FHSS) system, usually a usable frequency band is divided into a plurality of frequency bands (channels) having a fixed bandwidth and the carrier wave of a signal is transmitted while shifting from one channel to another. The particular channels to which a shift is made are given by a hopping pattern (HP). In order to perform communication using the FHSS system, it is required that both the sending and receiving sides have the same hopping pattern and that the system be operated in synchronized fashion. More specifically, demodulation on the receiving side must be performed while changing the reception frequency on the receiving side to follow up the hopping pattern on the sending side. That is, it is required that one and the same hopping pattern be shared by the wireless terminals on the sending and receiving sides in order for communication between the two terminals to be started.

In other words, a wireless terminal possesses only one hopping pattern, which is set when communication starts, and this wireless terminal is capable of communicating only with a specific wireless terminal having the same hopping pattern. Accordingly, in order for a plurality of wireless terminals to communicate with one another simultaneously, communication is carried out by applying time-division multiplexing to communication time based upon the hopping pattern used.

However, a problem arises with this method of communicating. Specifically, when communication time is time-division multiplexed by a single hopping pattern, in the manner mentioned above, in a scenario in which a plurality of wireless terminals communicate simultaneously, this hopping pattern is shared in communication with the other wireless terminals in time-division multiplexing. This means that one wireless terminal cannot communicate simultaneously with these wireless terminals and with another new wireless terminal outside this group.

Further, methods of changing over frequency in conventional wireless communication using frequency hopping include a method of switching frequency every communication frame in accordance with the hopping pattern and a method of switching frequency during the course of a communication frame.

When communication is performed, regardless of the frequency switching method, a communication frame is assembled by adding identification information such as the system ID or individual ID onto the beginning of the communication information and then transmitting the assembled communication frame. The receiving side analyzes the identification information of the received communication frame and accepts the ensuing communication information only if the identification information matches that of the receiving apparatus.

Further, in voice communication, transmission of audio information must be performed in continuous fashion owing to the need for real-time communication. In data communication, however, data cannot be transmitted continuously. In other words, data are transmitted at such time that the data are generated.

Accordingly, another system installed in the neighborhood of one's own apparatus is capable of performing data communication even it is communicating data with this apparatus by using the same hopping pattern. However, another wireless communication apparatus will not recognize the fact that the neighborhood system is communicating using the identical hopping pattern or a hopping pattern in which frequencies are superposed.

Further, with the method of switching frequency in the middle of a communication frame, identification information cannot be added onto all frequencies to which a changeover is made. This means that if an apparatus should happen to receive data transmitted from a system installed in the neighborhood, these data will be received accidentally as data transmitted to that apparatus.

SUMMARY OF THE INVENTION

Accordingly, an object of the present invention is to provide a wireless communication apparatus and method in which one wireless terminal is capable of communicating simultaneously with a plurality of other wireless terminals having a plurality of different hopping patterns.

Another object of the present invention is to provide a wireless communication apparatus and method in which even if another system situated in the neighborhood is communicating at the same frequency, it is possible to avoid receiving the data of this system accidentally.

According to the present invention, the foregoing objects are attained by providing a wireless communication apparatus for time-division multiplexed communication of a plurality of items of information using frequency hopping, comprising means for allocating a plurality of different hopping patterns for each of the plurality of items of information, means for storing the plurality of hopping patterns for each communication, frequency changeover means for changing over frequency for each of the plurality of items of information in accordance with the plurality of hopping patterns stored, and communication means for performing communication at a frequency to which a changeover has been made by the frequency changeover means.

According to the present invention, the foregoing objects are attained by providing a wireless communication method of time-division multiplexed communication of a plurality of items of information using frequency hopping, comprising a step of allocating a plurality of different hopping patterns for each of the plurality of items of information, a step of storing the plurality of hopping patterns for each communication, a frequency changeover step of changing over frequency for each of the plurality of items of information, and a communication step of performing communication at a frequency to which a changeover has been made at the frequency changeover step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a diagram showing the configuration of a system according to an embodiment of the present invention;

FIGS. 6A–6D are diagrams showing the structures of channels in the embodiment of the invention;

FIG. 20 is a flowchart of a terminating control operation performed by the control station according to the first embodiment;

DESCRIPTION OF THE PREFERRED EMBODIMENTS

First Embodiment

Description of Elements

Figure 2:
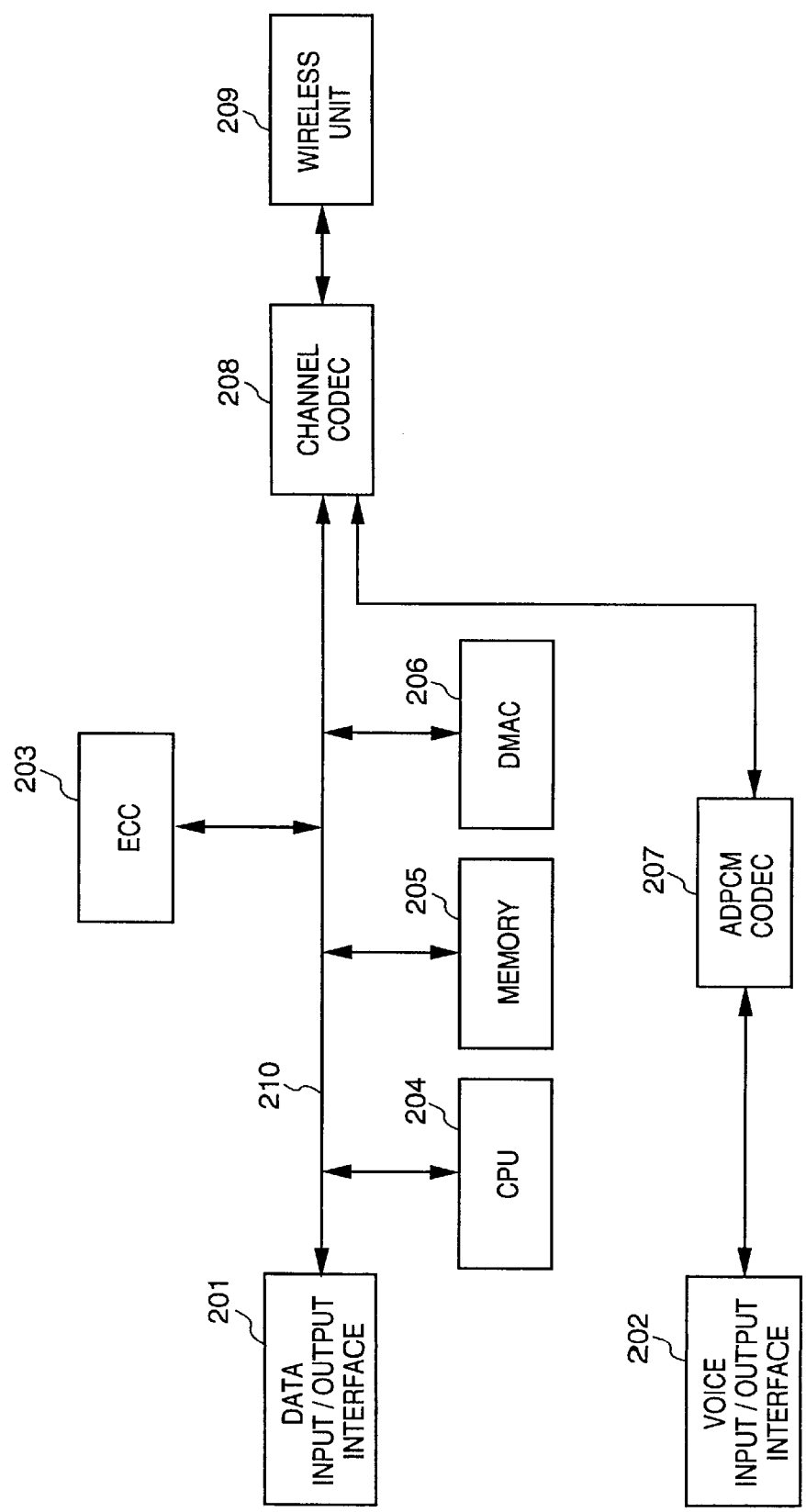
FIG. 2 is a block diagram showing the architecture of a wireless control unit according to the embodiment of the invention.

FIG. 1 is a diagram illustrating the configuration of a wireless communication system according to an embodiment of the invention.

As shown in FIG. 1, the system is composed of wireless terminals having a variety of functions. Shown in FIG. 1 are a public switched telephone network 101, a network controller 102 having a public line interface, a radiotelephone 103, a personal computer 104 to which a wireless PC card (not shown) has been connected, a printer 105 having an internal wireless controller, a wireless LAN adapter 106 having an Ethernet® interface, and a LAN 107.

Any one of these terminals functions as a centralized control station. The terminal serving as the centralized control station generates the reference timing of transmission frames and performs call control and management/allocation of hopping patterns. The other wireless terminals (terminal stations) operate based upon the timing generated by the centralized control station and, at the start of communication, send the centralized control station a transmission request and a request for allocation of a hopping pattern.

FIG. 2 illustrates the architecture of a wireless control unit equipped with a wireless terminal.

As shown in FIG. 2, the unit includes a data input/output interface such as a PCMCIA (personal computer memory card international association) interface, a Centronics interface or an Ethernet® interface, a voice input/output interface such as a handset interface of public switched telephone network interface, an error correction processor (ECC) 203, a CPU 204, a memory 205, a DMA controller 206, an ADPCM codec 207, a channel codec (CHC) 208, a wireless unit 209 and a data bus 210.

By changing the interfaces 201, 202, the wireless control unit can be used as a variety of wireless terminals without changing the construction of the unit.

Figure 3:
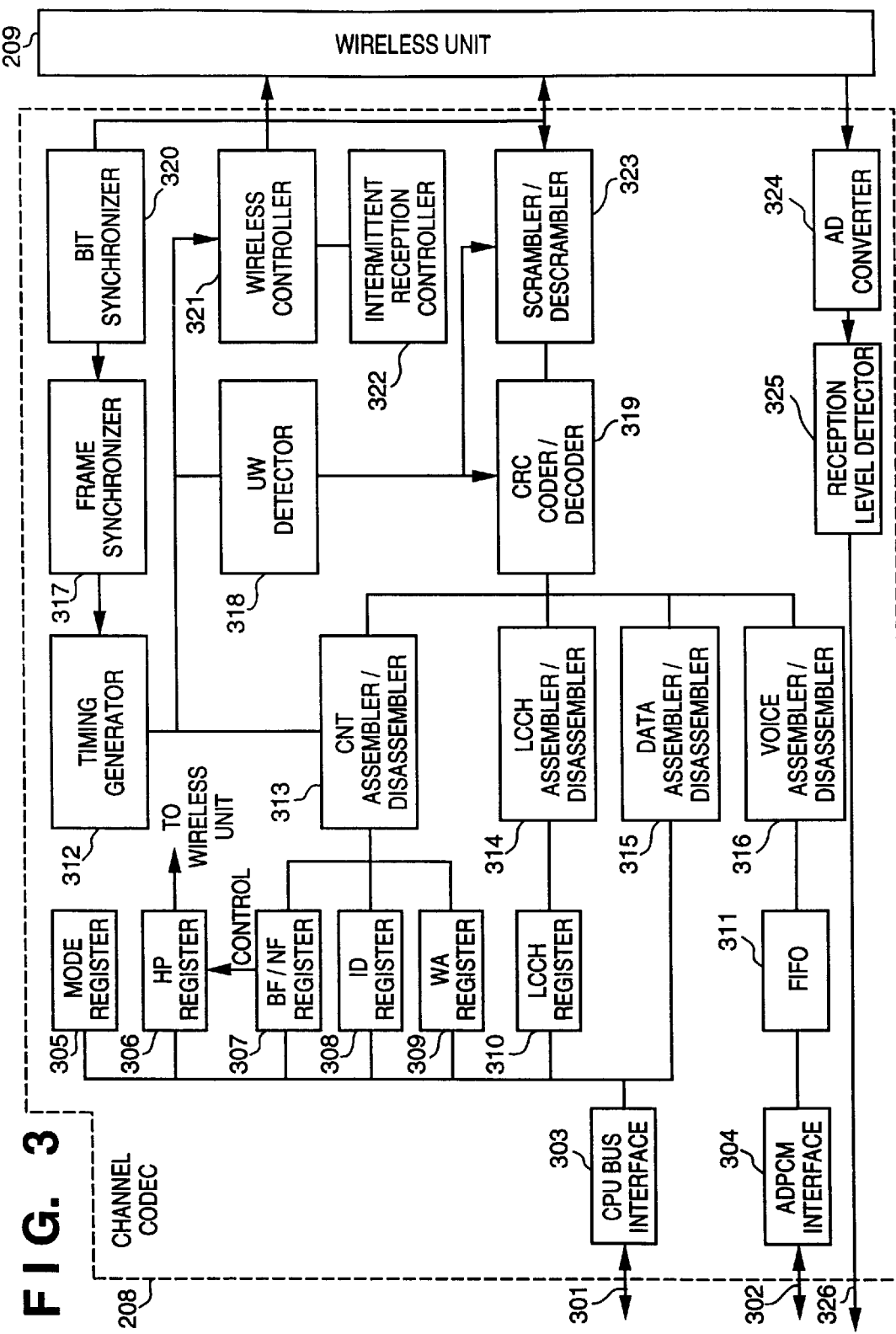
FIG. 3 is a block diagram showing the architecture of a channel codec according to the embodiment of the invention.

FIG. 3 is a diagram showing the internal construction of the channel codec of FIG. 2. The channel codec 208 includes a CPU data bus 301, a CPU bus interface 303, an ADPCM interface 304 for dealing with ADPCM-coded voice data 302, an ADPCM interface 304, a mode register 305 for setting operating data, a hopping-pattern register 306 capable of storing a plurality of hopping patterns, a BF/NF register 307 for a frame_number and/or next frequency number, a system ID register 308, an intermittent start-up terminal address register 309, an LCCH (logical control channel) register 310 for storing control data exchanged with a wireless terminal, an FIFO buffer 311, a timing generator 312 for controlling timing at which wireless link frames are sent and received, a CNT channel assembler/disassembler 313 for performing an exchange of system control data, an LCCH (logical control channel) assembler/disassembler 314, a data assembler/disassembler 315, a voice assembler/disassembler 316, a frame synchronizer 317, a unique-word detector 318, a CRC coder/decoder 319, a bit synchronizer 320, a wireless controller 321, an intermittent reception controller 322, a scrambler/descrambler 323, an AD converter 324, and a reception level detector 325 that outputs an interrupt signal 326. A wireless unit is indicated at 209.

Figure 4:
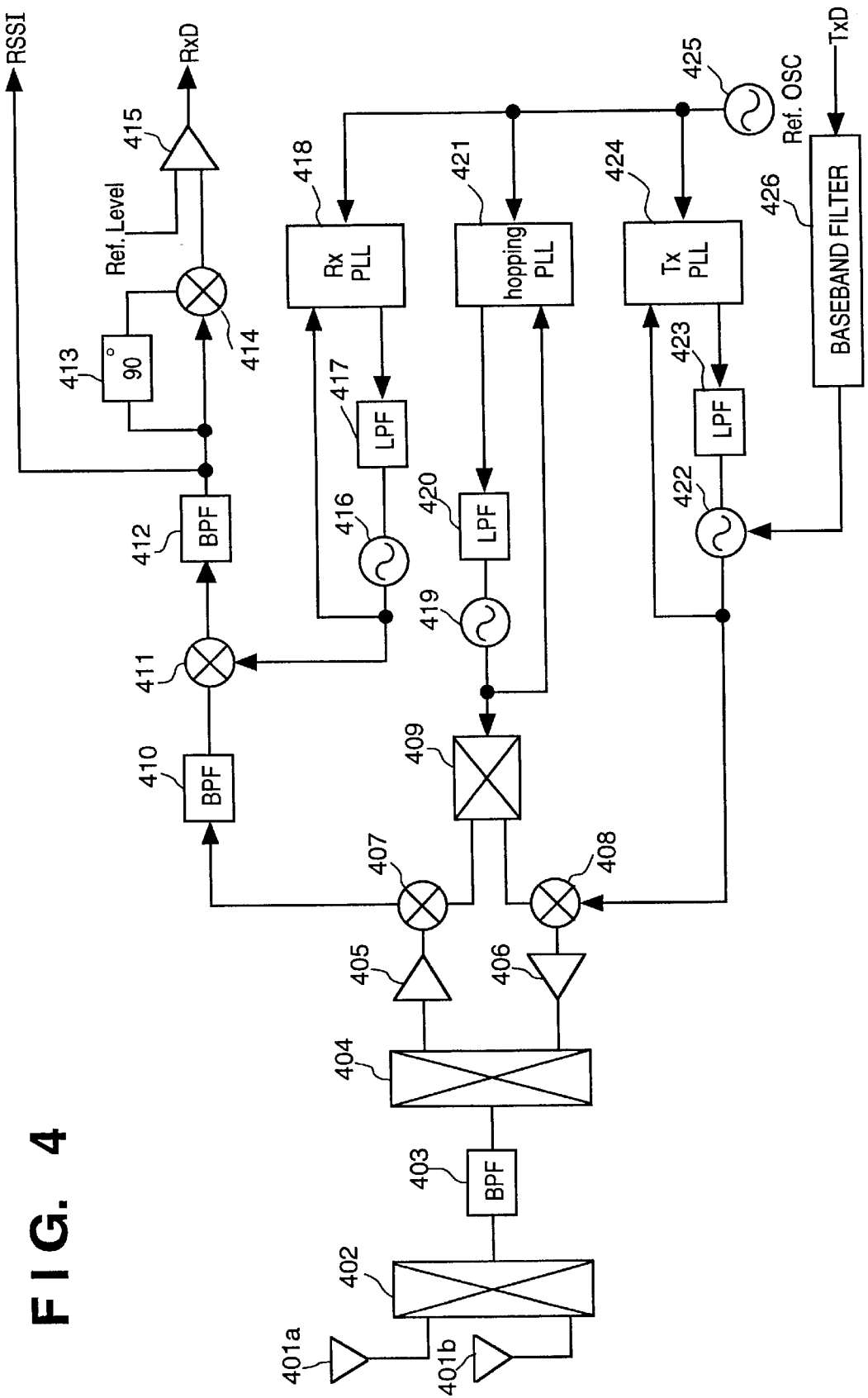
FIG. 4 is a block diagram showing the architecture of a wireless unit in the embodiment of the invention.

FIG. 4 is a block diagram showing the architecture of the wireless control section within the wireless control unit. The wireless section includes transceiving antennae 401a, 401b, a switch 402 for changing over between the antennae 401a, 401b, a bandpass filter (referred to as a "BPF") 403 for removing signals in unnecessary bands, a switch 404 for switching between transmission and reception, an amplifier 405 for reception, an amplifier (with power controller) 406 for transmission, a down-converter 407 for a first IF (intermediate frequency), an up-converter 408, a switch 409 for switching between transmission and reception, a BPF 410 for eliminating signals in unnecessary bands from the signal converted by the down-converter 407, and a down-converter 411 for a second IF (intermediate frequency). Double-conversion reception is implemented by the down-converters 407 and 411.

The wireless unit further includes a second IF BPF 412, a 90° phase shifter 413, a quadrature detector 414 for detecting and demodulating a signal received by the BPF 412 and phase shifter 413, a comparator 415 for waveshaping, a voltage-controlled oscillator (referred to as a "VCO" below) 416 for reception, a low-pass filter (referred to as an "LPF" below) 417, and a phase-locked loop (referred to as a "PLL") 418 constituted by a programmable counter, prescaler and phase comparator, etc. A frequency synthesizer in the reception loop is constructed by the VCO 416, LPF 417 and PLL 418.

The wireless section further includes a VCO 419 for generating a carrier signal, an LPF 420 and a PLL 421 constituted by a programmable counter, prescaler and phase comparator, etc., which are not shown. A frequency synthesizer for hopping is constructed by the VCO 419, LPF 420 and PLL 421. Further provided are a VCO 422 located in the transmission loop and having a modulating function, an LPF 423, and a PLL 424 constituted by a programmable counter, prescaler and phase comparator, etc., which are not shown. A frequency synthesizer located in the transmission loop and having a frequency modulating function is constructed by the VCO 422, LPF 423 and PLL 424. An oscillator 425 generates a reference clock for the PLLs 418, 421 and 424, and a filter (baseband filter) 426 limits the band of transmission data (the baseband signal).

Figure 5:
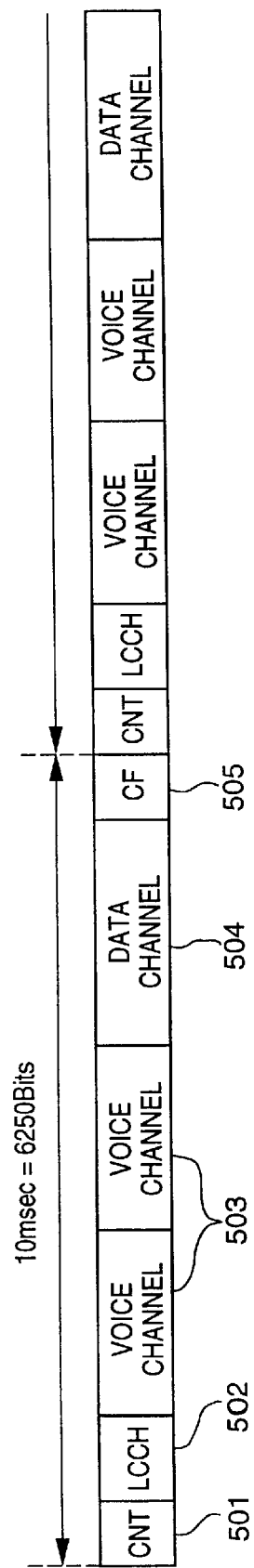
FIG. 5 is a diagram showing the structure of a wireless frame in the embodiment of the invention.

FIG. 5 is a diagram showing the structure of a wireless frame used in this wireless communication system.

As shown in FIG. 5, the frame includes a system control channel (CNT) 501, a line control channel (LCCH) 502, a voice channel 503 for performing voice communication, a data channel 504 for performing data communication, and guard time (a frequency changeover interval) CF 505 for the purpose of changing frequency. Since the length of one frame is made 10 ms using this low-speed frequency hopping wireless unit whose data transmission speed is 625 Kbps, 6250 bits of information can be sent per frame.

FIGS. 6A–D illustrate the details of each channel. In each channel, CS, CS0, CS1 and CS2 represent carrier sensing times, PR represents preamble time, SYN a frame synchronizing signal, ID an identification code, BF a basic frame number for communicating frame number information used in hopping pattern control, WA a terminal identification number which notifies of cancellation of a sleep mode (i.e., for starting up a terminal during intermittent reception), NF a next hopping frequency (for updating the HP register), Rev a reserve, CRC a redundant bit for error detection, GT guard time, UW a unique word, and DA the terminal identification number of the terminal that is the party to communication. The numerical values below the channel elements indicate the respective numbers of bits.

Figure 7:
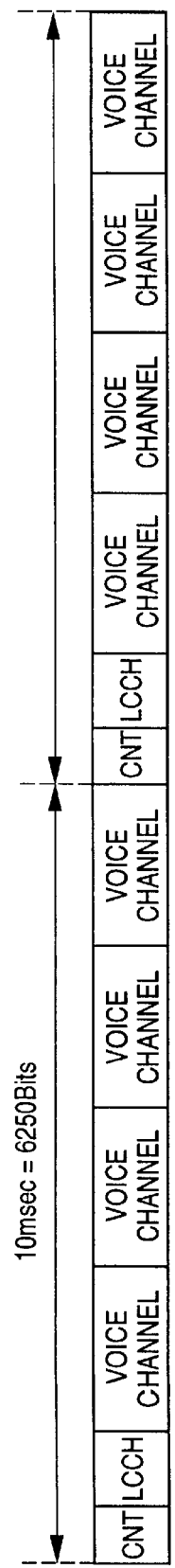
FIG. 7 is a diagram showing the example of the structure of a wireless frame.
Figure 8:
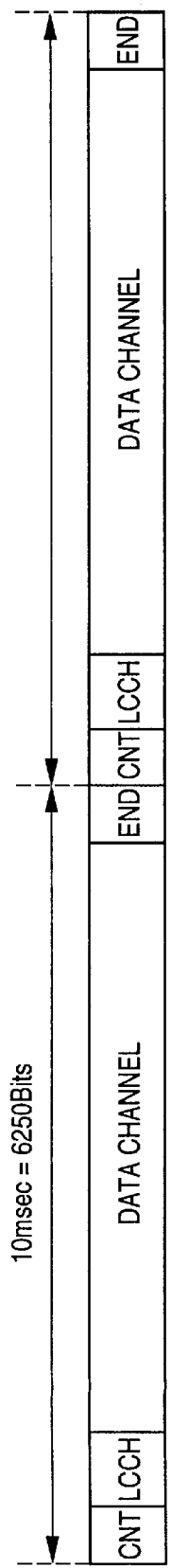
FIG. 8 is a diagram showing the example of the structure of a wireless frame.

FIGS. 7 and 8 illustrate other examples of frames. The entirety of the frame in FIG. 7 is for voice channels exclusively. The frame of FIG. 8 is for a data channel exclusively, in which a maximum of 5588 bits of data can be sent per frame. By suitably allocating the 6250 bits of one frame according to each channel, frames in which the number of voice channels and the amount of data communicated in data channels are changed can be used in communication in addition to the frames having the structure described above.

In this embodiment, the CNT channel and LCCH channel use a first hopping pattern as a control channel, two voice data channels use a second hopping pattern and a data channel uses a third hopping pattern.

Figure 9:
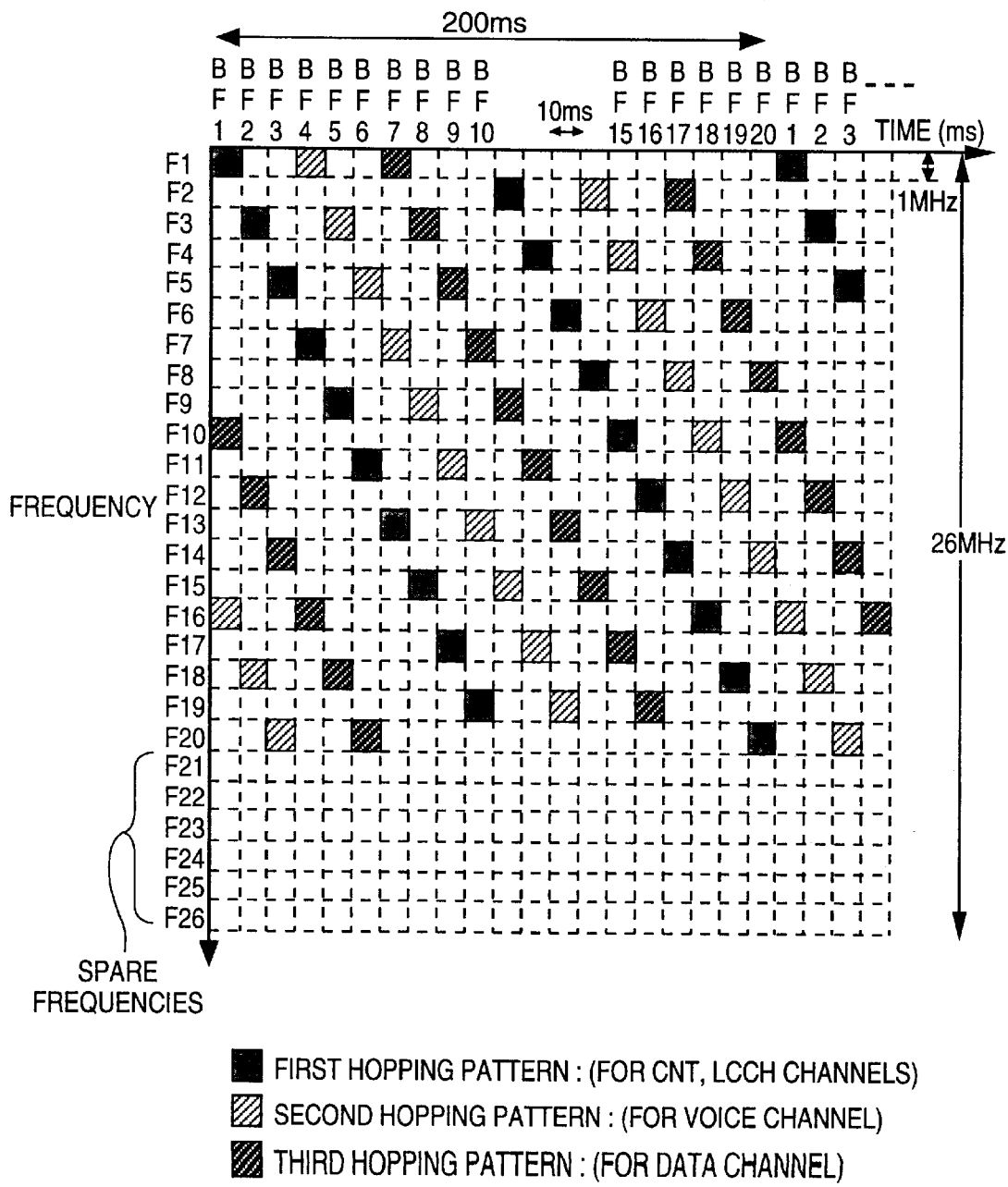
FIG. 9 is a conceptual view showing frequency hopping according to this embodiment.

FIG. 9 is a conceptual view of frequency hopping used in this system.

In the system according to this embodiment, use is made of 26 frequency channels each having a width of 1 MHz, utilizing a frequency band of 26 MHz. Taking into consideration cases in which there are frequencies that cannot be used because of interference noise, 20 frequency channels are selected from the 26 channels and frequency hopping is carried out over the selected frequency channels in a predetermined order.

In this system, one frame has a length of 10 ms and a different frequency channel is hopped every frame. Consequently the length of the period of one hopping pattern is 200 ms.

In FIG. 9, different hopping patterns are indicated by different designs. Patterns in which the same frequencies are not used at the same times are employed by each frame. As a result, it is possible to prevent the occurrence of data errors.

Figure 10:
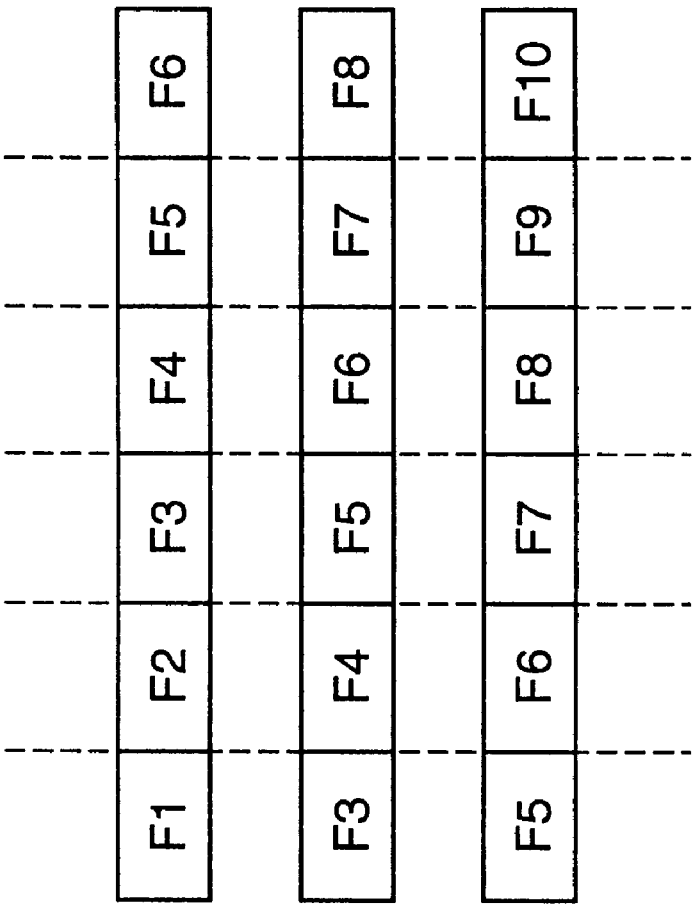
FIG. 10 shows examples of hopping patterns in the embodiment of the invention.

As shown in FIG. 10, in this system control is performed in such a manner that a first hopping pattern (HP1) is used in the CNT and LCCH channels, a second hopping pattern (HP2) is used in the voice channel and a third hopping pattern (HP3) is used in the data channel, as a result of which the channels will not use the same frequency at the same time. This makes it possible to send and receive data to and from a different party per channel.

In order to reduce the number of hopping patterns retained in the channel codec, the hopping patterns used by the respective channels are generated by temporally shifting patterns in which the frequencies are arranged in the same order.

Figure 11:
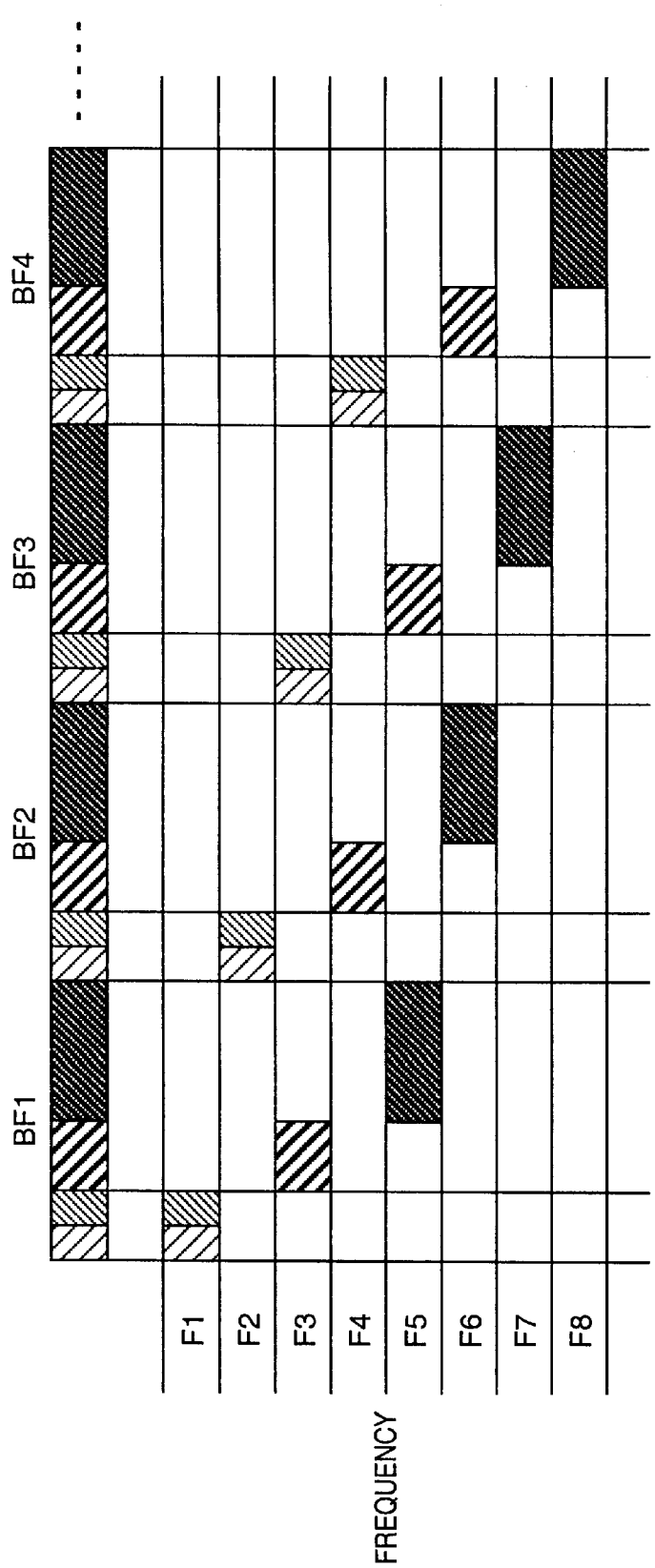
FIG. 11 is a conceptual view of time-divided channels and frequency hopping.

FIG. 11 illustrates the concept of four channels used in this system and the frequency hopping corresponding to each channel. FIG. 11 illustrates the manner in which the control channels, voice channel and data channel undergo hopping independently.

Basic control of the wireless control unit according to this embodiment of the invention will now be described in accordance with FIGS. 2 through 11.

Types of Transmitted Data

The data transmitted in this system are broadly divided into three types.

The first type of data is control data for performing call control such as a transmission request. These data are generated in accordance with a program that has been stored in a ROM. The data are written to the LCCH register 310 in the data codec 208 via the CPU data bus 210.

The second type of data is real-time data such as voice data. These data are entered from the voice input/output interface 202. An analog voice signal is converted to a digital code by the ADPCM codec 207 and is acquired by the channel codec 208 at a predetermined timing.

The third type of data is non-real-time data sent from the memory of a personal computer or the like, by way of example. These data are entered from the data input/output interface 201 and are stored in the memory 205 by DMA transfer under the control of the DMAC 206. When a prescribed amount of these data are stored in the memory 205, coding is applied by the error correction processor (ECC) 203, at which the data are DMA-transferred to the channel codec 208.

It should be noted that when these data are received, the data flow in a manner which is the exact opposite of that described above.

Operation of Channel Codec

The channel codec 208 functions to assemble data in the frame format shown in FIG. 5 and to send data, which have been obtained by disassembling a frame, to the input/output interface 201. The operation of the channel codec 208 will now be described.

First, a reference for the operating timing of the channel codec 208 is generated by the timing generator on the side of the centralized control station described in conjunction with the system of FIG. 1. The centralized control station transmits a frame in accordance with this timing, and a terminal that has received the frame maintains frame synchronization in accordance with the frame synchronizing word within the frame.

Data sent from the centralized control station by way of the CNT channel are stored in a register within the channel codec 208. The channel codec 208 has the HP (hopping-pattern) register 306, the ID register 308 and the WA (start-up terminal address) register 309. On the side of the centralized control station, the internal CPU writes the necessary values to these registers. The value within the BF/NF register 307 for the frame number and/or next frequency number is updated in sync with the operating timing. The frequency number written to the NF register is the hopping pattern (the first hopping pattern) of the CNT channel. The channel codec 208 reads the data out of these registers at the timing at which the data of the CNT channel are transmitted, the data are assembled by the CNT assembler 31 and the assembled data are transmitted.

When the CNT channel is received at the terminal station, the CNT assembler/disassembler 313 disassembles the data of this channel and executes processing using the value contained in each portion of the received channel. More specifically, the terminal station determines whether the received ID matches the value that has been written in its own ID register 308, and control is performed in such a manner that the ensuing data are received only if a match is obtained. In a case where the received WA coincides with the value in its own WA register 309 during intermittent reception, the terminal station generates a start-up request interrupt. Furthermore, the terminal station utilizes the received BF, NF information and rewrites the content of the data contained in the hopping-pattern register 306.

The frequency number that has been written in the NF field of the CNT channel is that of the hopping pattern of the CNT channel. Therefore, the hopping patterns used by the voice channel and data channel are generated by temporally shifting the hopping pattern created based upon the frequency number that has been written in the NF field.

With regard to the LCCH channel, the CPU on the sending side uses the LCCH assembler/disassembler 314 to assemble the data that have been stored in the LCCH register 310 within the channel codec 208. The assembled data are transmitted at the predetermined timing. In order to prevent collision with other terminals, the LCCH channel is provided with a plurality of carrier sensing fields. Further, on the receiving side, the received LCCH channel is disassembled by the LCCH assembler/disassembler 314. Once the disassembled data have been stored in the LCCH register 310, an interrupt is generated and applied to the CPU. In response to the interrupt, the CPU reads the data in the register.

With regard to the voice channel, the channel codec uses the voice assembler/disassembler 316 to assemble data that have entered via the ADPCM interface 304 and transmits the assembled data at the predetermined timing. Conversely, on the receiving side, the received voice channel is disassembled by the voice assembler/disassembler 316 at the predetermined timing and the results are outputted via the ADPCM interface 304 at the timing at which processing is performed in the ADPCM codec 207.

With regard to the data channel, the data are transmitted only if the CPU has requested data transmission. If data transmission has been requested, the CPU bus interface 303 of the channel codec 208 outputs a DMA request to the DMA controller (DMAC) 206 at the timing of every byte. When the DMAC 206 responds to the DMA request and data is written in, the data is converted to a serial one and transmitted at the predetermined timing by the data assembler/disassembler 315. Conversely, in a case where the data channel is received, the data assembler/disassembler 315 converts the data to parallel data and outputs a DMA request to the DMAC 206 byte by byte. The DMA controller 206 transfers the received data to the memory 205. When the transmission of one frame of data ends, an interrupt is generated and applied to the CPU. Upon receiving the interrupt, the CPU executes processing such as processing for acquiring memory for reception of the next frame.

When data are transmitted by all of the above-mentioned channels, the CRC coder 319 generates a CRC code, stores the code in the CRC field and then transmits the result. The CRC is performed on the receiving side and the occurrence of an error is detected. Further, all transmission data other than the frame synchronizing word and unique word are scrambled in the scrambler/descrambler 323. This is to alleviate an imbalance in the transmitted data and to facilitate the extraction of the synchronizing clock.

Conversely, when the frame synchronizing word or unique word is detected at the time data reception, descrambling is carried out in the scrambler/descrambler 323 at the timing at which the word is received, a CRC check is carried out and, at the same time, data are entered disassembled portion of each field.

Example of Operation

In this system as described above, control is such that a frame composed of a plurality of channels for communication between terminals is assembled and the frequency used is changed over at regular time intervals.

The specific operation of this system will be described for a case where a handset connected to a personal computer is used to perform voice communication via the network controller, a case where a personal computer performs a file transfer with another personal computer, and a case where the voice communication and data communication are carried out simultaneously. In this embodiment, the description will be rendered on the assumption that the network controller connected to the public telephone line functions as a centralized control station.

Figure 12:
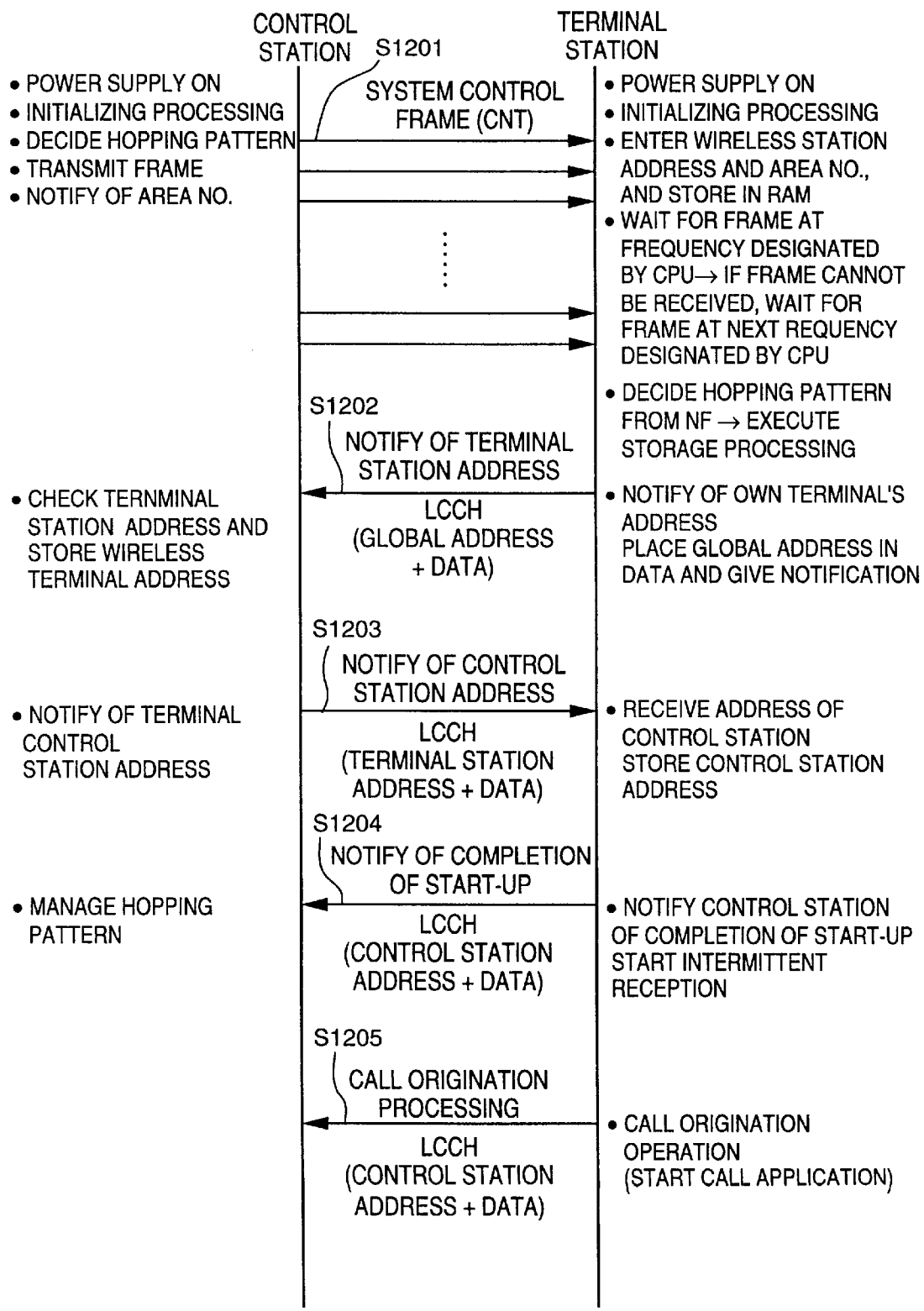
FIG. 12 is a sequence diagram showing a sequence of operations performed by a control station and a terminal station when power is introduced.
Figure 13:
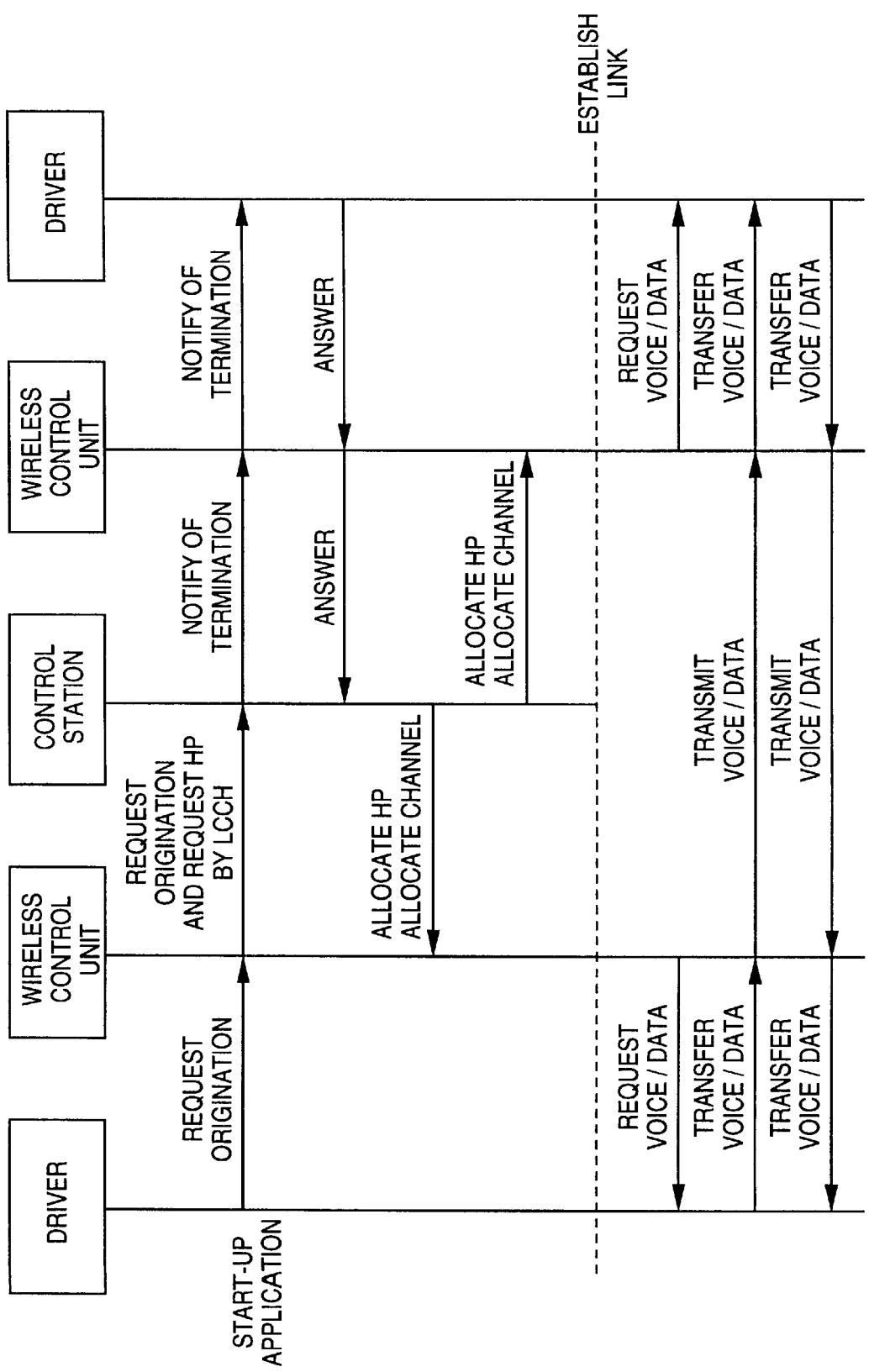
FIG. 13 is a sequence diagram showing a call-control sequence up to the start of transmission.
Figure 14:
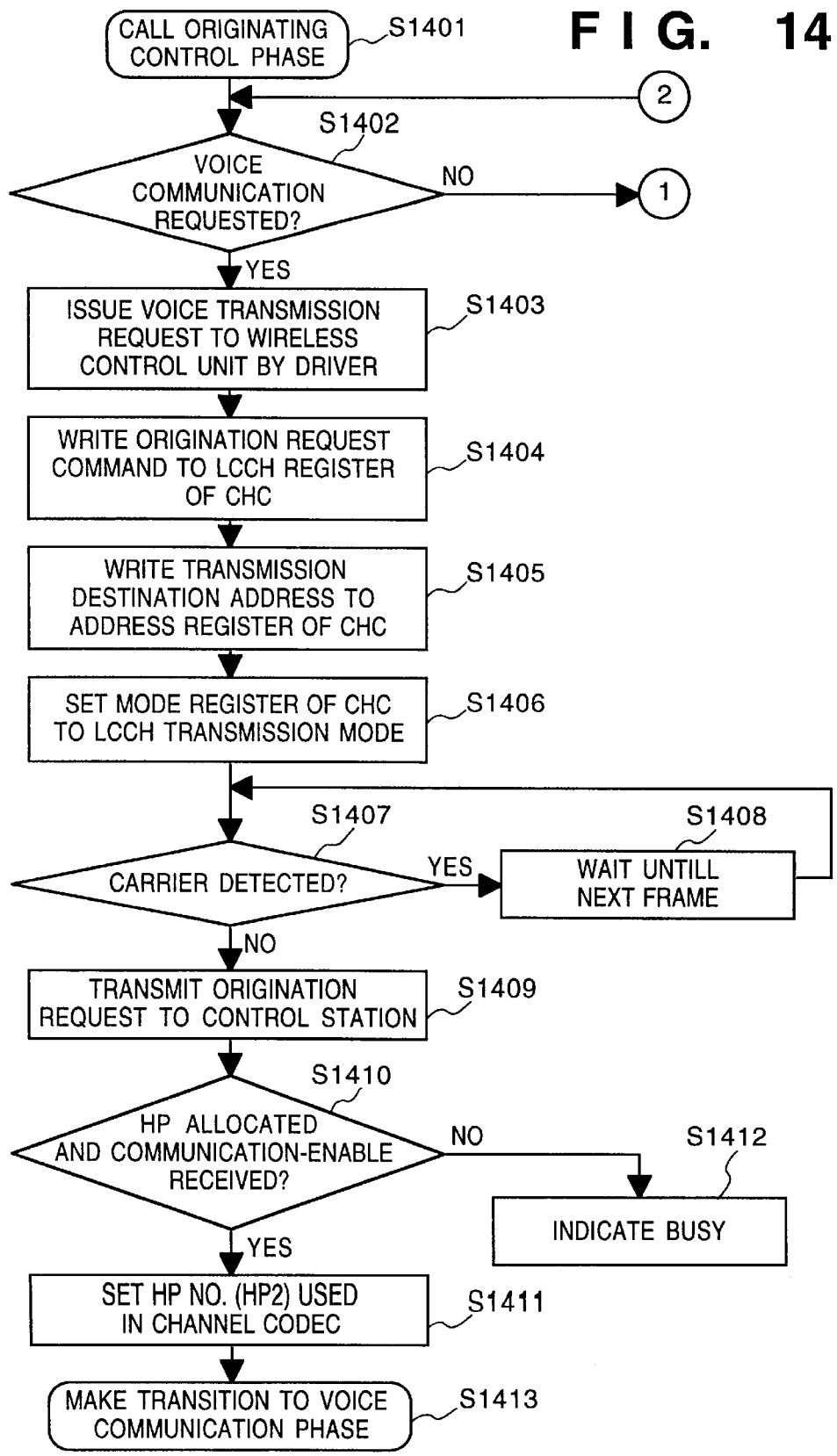
FIG. 14 is a flowchart of a voice communication control operation according to a first embodiment of the invention.
Figure 15:
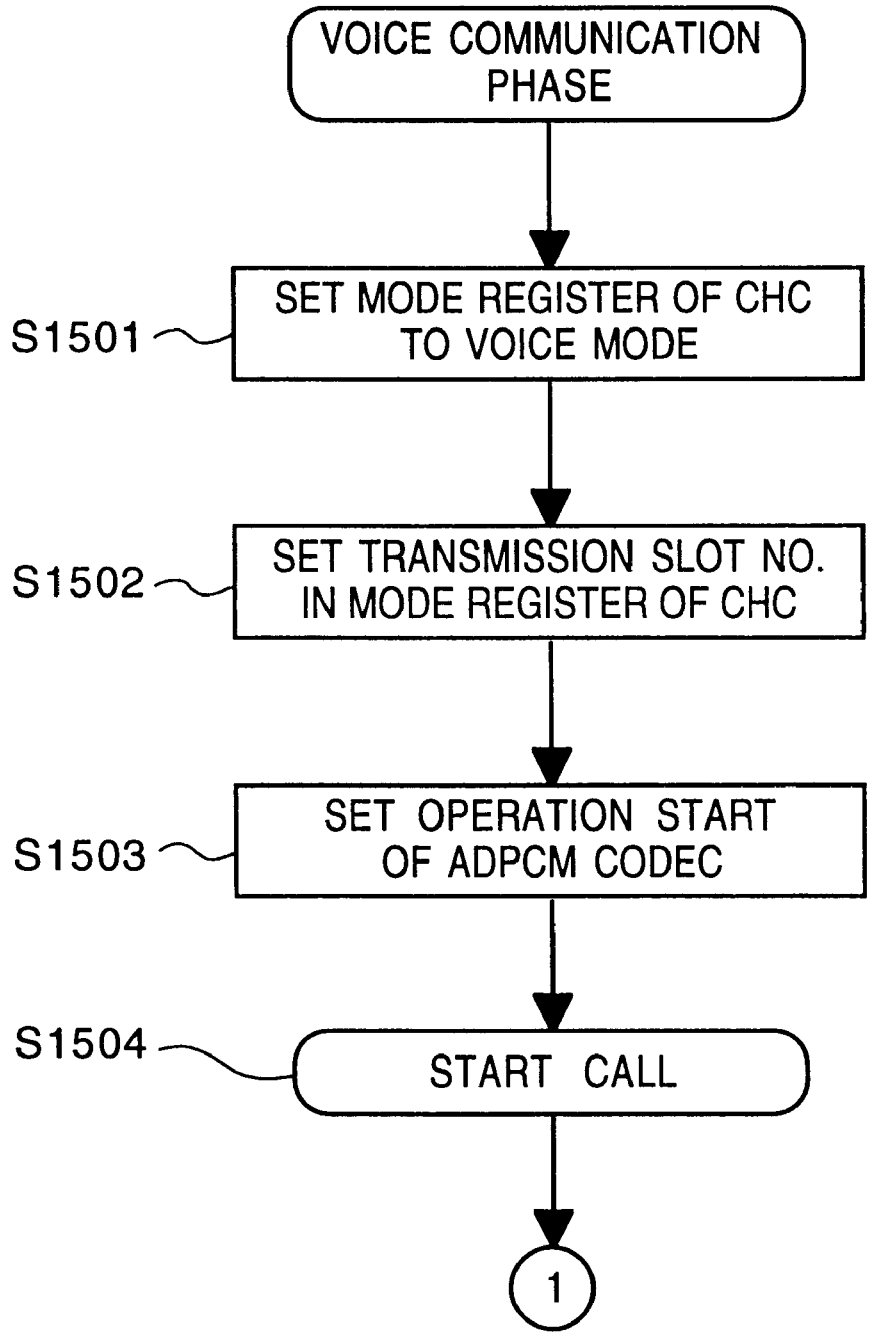
FIG. 15 is a flowchart of voice communication control according to the first embodiment of the invention.
Figure 16:
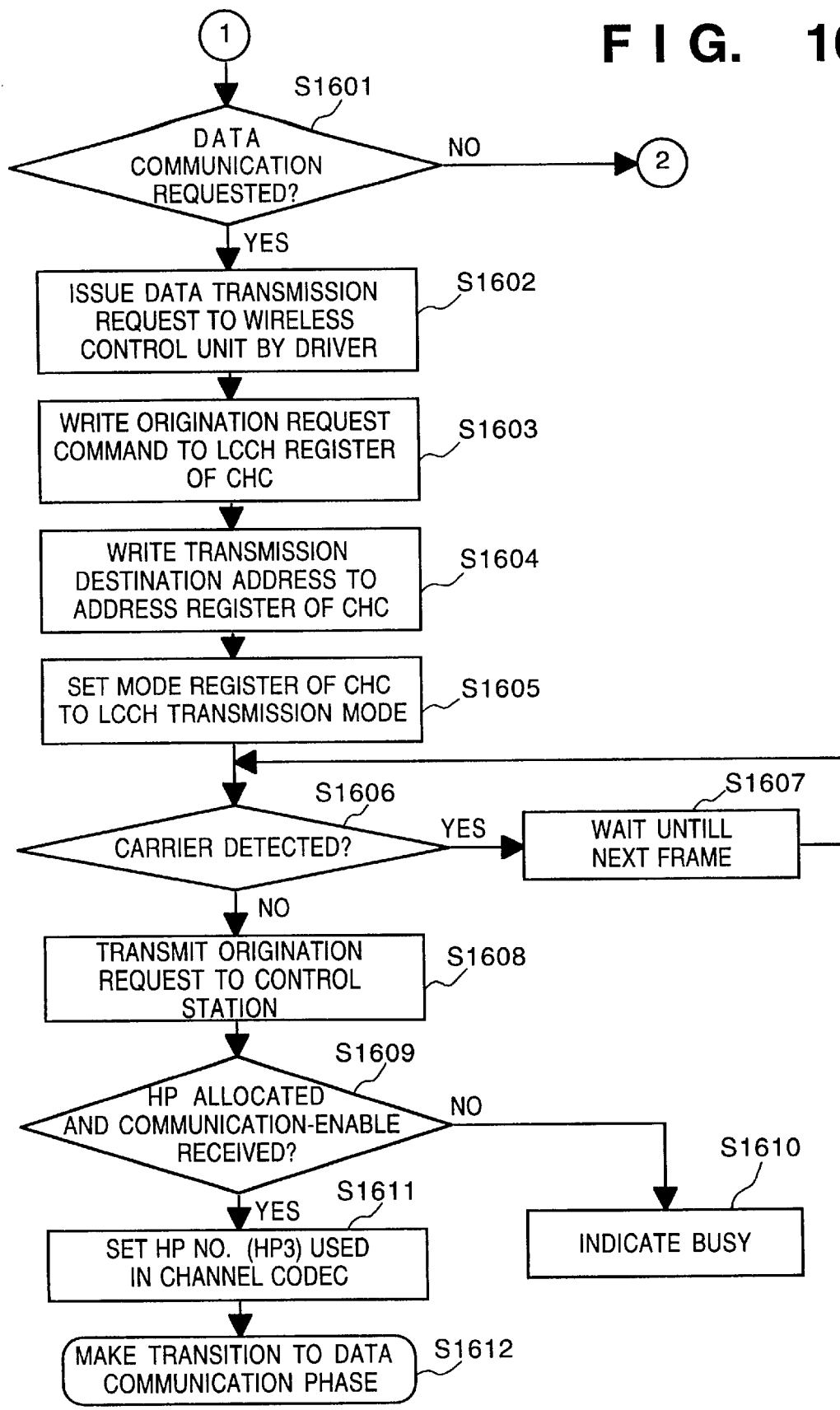
FIG. 16 is a flowchart of a data communication control operation according to the first embodiment of the invention.
Figure 17:
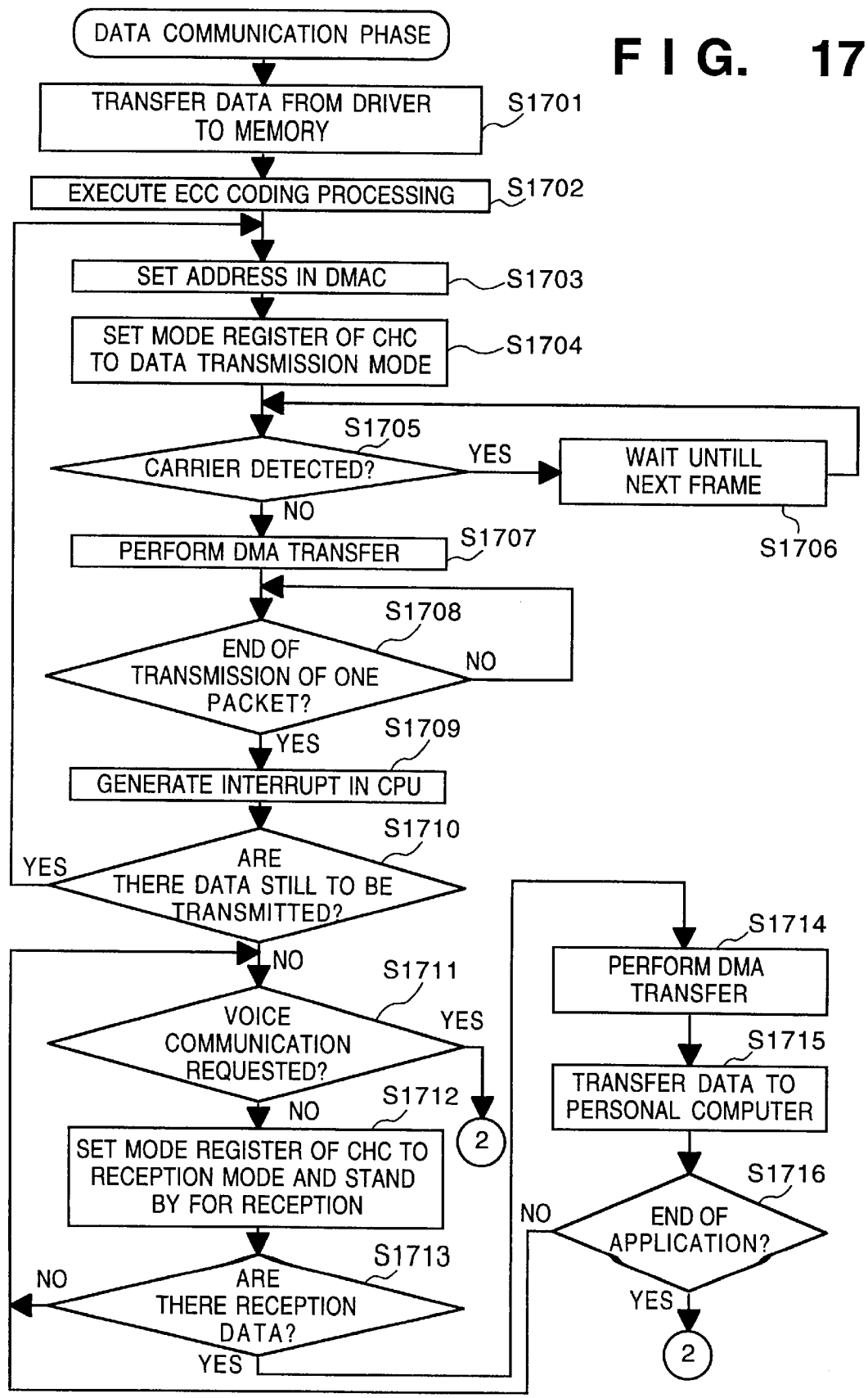
FIG. 17 is a flowchart of a data communication operation according to the first embodiment of the invention.
Figure 18:
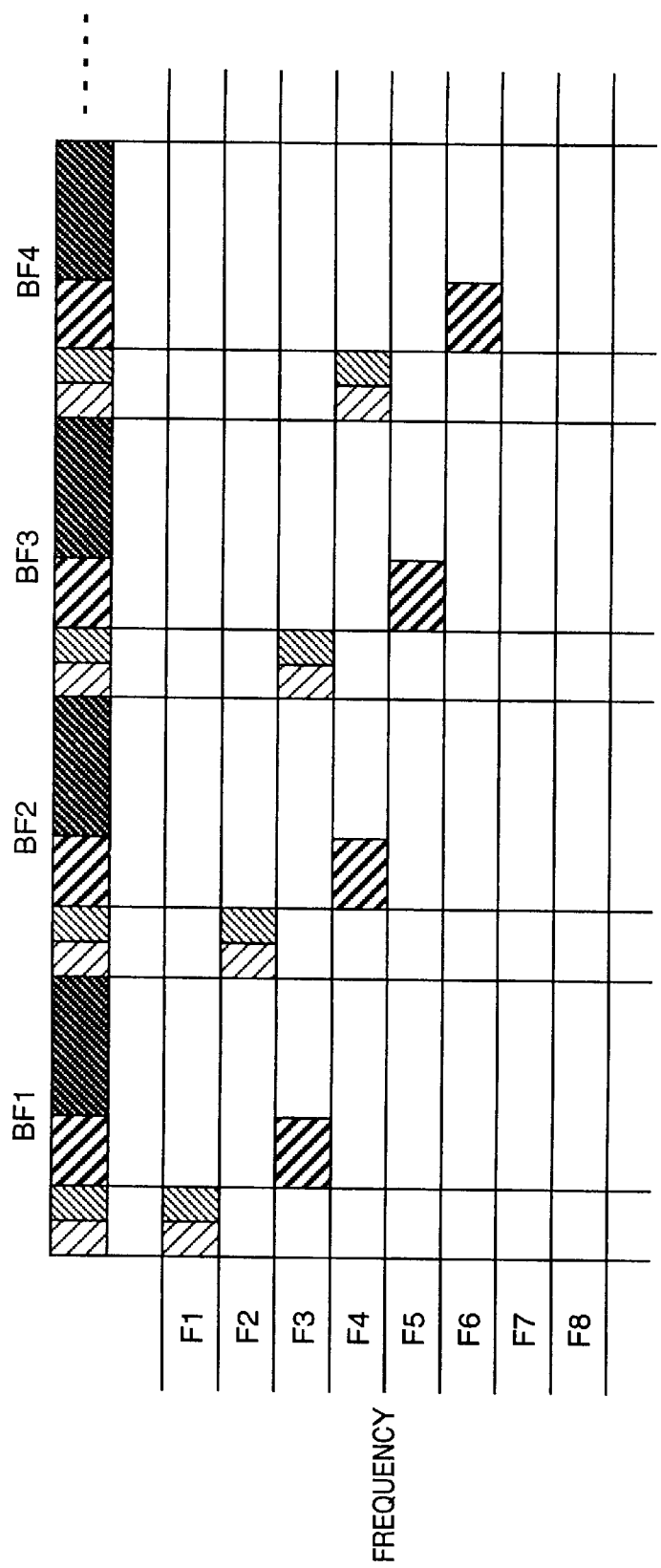
FIG. 18 is a conceptual view of time-divided channels and frequency hopping at the time of voice communication.
Figure 19:
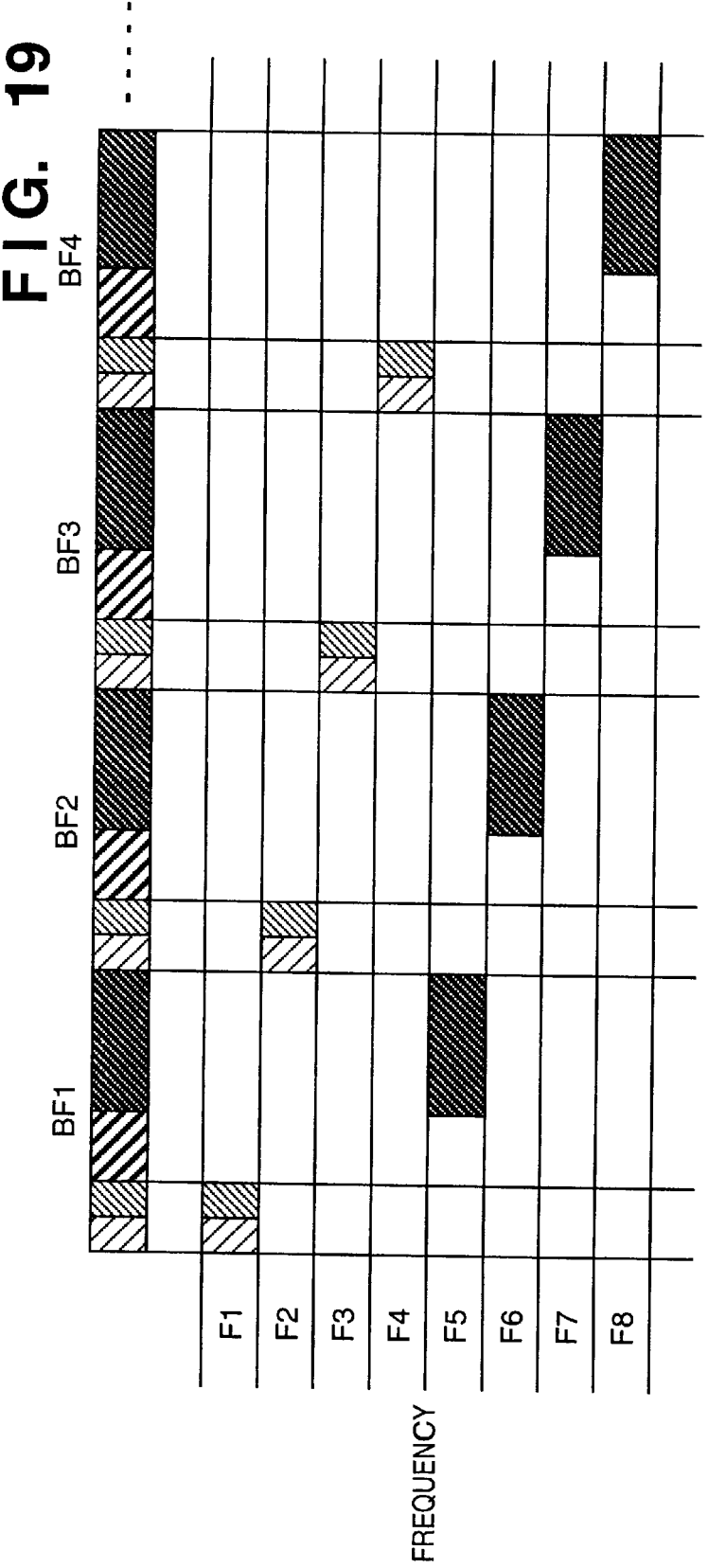
FIG. 19 is a conceptual view of time-divided channels and frequency hopping at the time of data communication.

FIG. 12 is a sequence diagram showing a sequence of operations performed by a control station and a terminal station when power is introduced to the system, FIG. 13 is a sequence diagram showing a call-control sequence up to the start of data transmission or voice communication, FIG. 14 is a flowchart of a voice communication control operation in a personal computer, FIG. 15 is a flowchart of operation when voice communication starts, FIG. 16 is a flowchart of a data communication control operation in a personal computer, FIG. 17 is a flowchart of a data communication operation in a personal computer, FIG. 18 is a conceptual view of time-divided channels and frequency hopping at the time of voice communication, and FIG. 19 is a conceptual view of time-divided channels and frequency hopping at the time of data communication.

The invention will now be described in accordance with these FIGS. 12 through 19.

Sequence of Operations by Control Station and Terminal Station at Start-Up

When power is introduced and the terminal is initialized at sequence S1201 in FIG. 12, the terminal determines, based upon the set value in an external switch, whether it is a control station or a terminal station. If the terminal recognizes the fact that it is a control station, then the station decides the first hopping pattern for the control channel, assembles the synchronizing signal, hopping pattern information and its own area number into a frame and outputs the frame as the CNT frame at predetermined timings.

Similarly, when the terminal recognizes, after start-up, that it is a terminal station based upon the set value in the external switch, then the station stores its own address and the received area number of the control station. When this processing ends, the terminal waits for the CNT frame from the control station at any frequency. When the CNT frame from the control station is received, the hopping frequency is acquired in the next unit time based upon NF in this frame. The terminal station changes the reception frequency based upon this frequency and waits for the next CNT frame. This processing is repeated at the terminal station, the hopping pattern being used at the control station is recognized and this hopping frequency is stored in the HP register 306 in the channel codec 208.

When the storing of hopping patterns is finished at the terminal station, the latter uses the LCCH frame at sequence S1202 to notify the control station that it (the terminal station) is being added on as a new terminal station. At this time a global address which will be received by all terminals is included in the DA of the LCCH frame, data indicating that registration is performed anew are included in the data portion of the LCCH frame and then the frame is transmitted. The control station receives the LCCH frame from the terminal station and, if a global address is present in the DA of this frame, receives the data contained in the data portion. If the data contains the address of the terminal station and registration request data, then, on the basis of this address and data, the control station stores the address of the terminal station and registers the address anew as the terminal station.

When registration is finished, the control station notifies the newly registered terminal station of the address of the control station using the LCCH frame at sequence S1203. Upon receiving the address of the control station by way of this LCCH frame, the terminal station stores the address of the control station. When the above-mentioned processing is finished, the terminal station uses the LCCH frame at sequence S1204 to notify the control station of the fact that start-up is completed. Upon receiving this notification of completion of start-up from the terminal station, the control station effects a transition to ordinary processing.

After outputting notification of end of start-up, the terminal station is capable of making a transmission at sequence S1205.

Voice Communication Control

When a transition is made to the transmission control phase (step S1401 in FIG. 14) at the start of voice communication, the terminal station determines whether voice communication has been requested (S1402). If voice communication has been requested ("YES" at step S1402), a personal-computer voice communication application program is started up (see FIG. 13). When this is done, a wireless unit driver that has been installed in the personal computer operates and sends the wireless control unit a voice transmission request and a transmission destination number (the extension number of the other party's terminal) via the data input/output interface (S1403).

Next, the wireless control unit begins a call origination procedure. Specifically, the wireless control unit writes a call origination request command to the LCCH register 310 in the channel codec 208 as LCCH data (S1404), writes the address of the centralized control station to the destination address register (S1405) and then sets the mode register 305 of the channel codec 208 to the LCCH transmission mode (S1406). At the time of LCCT transmission, carrier detection is performed by the carrier sensing field in the channel codec 208 (S1407). If a carrier is detected in this period of time, it may be considered that another terminal is using the LCCH channel. Accordingly, contention control, which involves suspending data transmission until the next frame, is carried out (S1408). If a carrier is not detected, it may be considered that another terminal is not using the LCCH channel. Accordingly, transmission of data to the centralized control station is started (S1409). It should be noted that the hopping pattern used in transmission of the LCCH data is the first hopping pattern, which is the same as that of the CNT channel.

Upon receiving the call origination request command, the centralized control station executes call origination processing, such as dialing a public telephone line. If an answer is received from the called terminal via the public telephone line, a termination notification command is sent, by way of LCCH, to the personal computer that issued the origination request. Furthermore, notification is given of the hopping pattern (the second hopping pattern) which prevails when the voice data are exchanged between the personal computer and the centralized control station, and notification is given of which of the two voice channels is used on the sending side (S1410).

The personal computer, which has received notification of call termination, the hopping pattern and allocation of the channel used, sets the second hopping pattern used by the call communication channel as well as the channel used in the HP register 306 of the channel codec 208 and starts the operation of the ADPCM codec (S1411). As a result, a transition is made to the voice communication phase (S1413). If reception of communication enable is not carried out at S1410, then a busy indication is made at the terminal station (S1412).

With regard to start of a call, the mode register 305 in the channel codec 208 is set to the voice mode (S1501 in FIG. 15), the transmission slot number is set in the mode register (S1502) and the start of operation of the ADPCM codec is set (S1503).

The voice call starts (S1504) and it is determined at S1601 in FIG. 16 whether there is a request for data communication.

By virtue of this procedure, a link is established among the personal computer, the network controller and the other party's terminal and a call between the personal computer and the other party's terminal begins.

During voice communication, the voice that has entered from the handset provided on the personal computer is coded by the ADPCM coder 207, the coded voice data enters the channel codec 208, a preamble and a unique word are added on every 160 bits, and the resulting data are scrambled and then transmitted at the position of the predetermined voice channel.

When bit synchronization is established in the preamble section of the received voice data in the voice channel and the unique word is detected at the time that audio is received, descrambling is carried out. The descrambled data are decoded by the ADPCM codec 207 and the decoded data are outputted as a voice from the speaker of the handset.

At this time the frequency of the control channel is changed over in the manner F1, F2, F3, F4, . . . in accordance with the first hopping pattern, as shown in FIG. 10, and the voice channel changes over the frequency in the manner F3, F4, F5, F6, . . . . Therefore, the changeover of frequency when voice communication is being carried out is as shown in FIG. 18. That is, frequency changeover at the time of voice communication is F1, F3, F2, F4, F3, F5, . . . .

Data Communication Control Operation

If voice communication is not requested at step S1402 in FIG. 14 and the terminal station issues a data communication request at S1601 in FIG. 16 ("YES" at S1601), a data communication application program in a personal computer is started up and a wireless unit driver that has been installed in the personal computer operates and sends the wireless control unit a data transmission request and a transmission destination number (the extension number of the other party's terminal) via the data input/output interface (S1602).

Next, a transition is made to a call origination procedure similar to that executed in the case of voice communication described above (S1603–S1608) and transmission of the LCCH data to the centralized control station begins.

Upon receiving the call origination request command, the centralized control station notifies the other party's terminal of call termination using the LCCH. If an answer is sent back from the other party's terminal, the establishment of the call is completed by sending two terminals the hopping pattern (third hopping pattern) for sending and receiving of data (S1608).

When the two terminals obtain the third hopping pattern for sending/receiving data as the result of the foregoing procedure (S1609), the third hopping pattern used is set in the HP register of the channel codec 208 (S1611). Sending/receiving of data is performed while the frequency is changed over in accordance with the given hopping pattern in the data channel (S1612). More specifically, the driver of the wireless control unit transfers the data transmitted from the memory 205 of the personal computer to the memory 205 of the wireless control unit (S1701), as shown in FIG. 17. If reception of communication enable is not carried out at S1609 in data communication control as well, then a busy indication is presented (S1610).

The wireless control unit subjects the data that has been stored in the memory 205 to error correction coding and stores the coded data in the memory 205 again (S1702). The wireless control unit then sets an address for DMA transfer from the memory 205 to the channel codec 208 in the DMA controller 206 (S1703) and sets a transmission request in the mode register 305 of the channel codec 208 (S1704). Upon receiving the transmission request, the channel codec 208 performs carrier detection (S1705). If a carrier is detected, the channel codec 208 stands by for one frame (S1706). If a carrier is not detected, then the channel codec 208 generates a DMA request in one byte units in conformity with the timing of the data channel. Upon receiving the DMA request, the DMA controller transfers the data in the memory 205 to the channel codec 208 (S1707). The channel codec 208 adds on the preamble and the unique word, scrambles the data and then transmits the scrambled data (S1708).

When transmission of one packet is finished ("YES" at step S1708), an interrupt is generated in the CPU (S1709). If there are data still to be transmitted, then the program returns to step S1703 and transmission processing is executed (S1710).

In a case where there are no data to be transmitted, it is determined whether there is a request for voice communication (S1711). If voice communication has already been carried out, a request for voice communication is not issued anew. However, if only data communication has been carried out and voice communication is requested anew, then the program proceeds to S1402 of FIG. 14.

If voice communication is not requested at S1711, then the mode register 305 in the channel codec 208 is set to the reception mode and reception is awaited (S1712).

In the wireless control unit on the receiving side, the DMA controller is set beforehand to a mode for transfer from the channel codec 208 to the memory 205. When data are received ("YES" at S1713), bit synchronization is established in the preamble section of the received data in the channel codec 208. When a unique word is detected, descrambling is performed. In addition, a DMA request is generated in units of one byte in the data section. Upon receiving the DMA request, the DMA controller transfers data from the channel codec 208 to the memory 205 (S1714). When transfer of one packet of data is finished, a reception-completion interrupt is generated by the channel codec 208 and the CPU applies error correction demodulating processing to the data stored in the memory 205. As a result, the final reception data are obtained and the data are transferred to the personal computer (S1715).

Transmission of data can be carried out through the procedure described above. In a case where there are data still to be transmitted, the same procedure is repeated by reason of the fact that execution of the application is unfinished ("NO" at S1716). This makes it possible to transmit an unlimited amount of data.

As shown in FIG. 10, the changeover of frequency of the control channel when data communication is being carried out in the manner described above is F1, F2, F3, F4, . . . , and the changeover of frequency of the data channel is F5, F6, F7, F8, . . . .

In other words, the changeover of frequency for data communication only (voice communication is not performed) is F1, F5, F2, F6, F3, F7, . . . , as shown in FIG. 19.

Other Forms of Communication

Described next will be a case where a request for data communication shown in FIGS. 16 and 17 is issued while voice communication illustrated in FIGS. 14 and 15 is in progress, i.e., a case where a file transfer is performed between a first personal computer and a second personal computer while voice communication is being carried out via a network controller using a handset connected to the first personal computer.

The hopping patterns used in simultaneous voice communication and data communication are decided individually just as at the time of voice communication and at the time of data communication. That is, both forms of communication are carried out using entirely different hopping patterns. The personal computer that performs voice communication and data communication simultaneously stores the first hopping pattern for the control channel, the second hopping pattern for the voice channel and the third hopping pattern for the data channel in the HP register 306 of the channel codec 208.

The wireless unit 209 performs communication by changing over frequency in accordance with the three hopping patterns that have been stored in the HP register 306 of the channel codec 208.

More specifically, as shown in FIG. 10, the wireless unit abides by the hopping pattern (F1, F2, F3, F4, . . . ) of the control channel, the hopping pattern (F3, F4, F5, F6, . . . ) of the voice channel and the hopping pattern (F5, F6, F7, F8, . . . ) of the data channel, and frequency is changed over in the manner F1, F3, F5, F2, F4, F6, F3, F5, F7, . . . , as depicted in FIG. 11.

Call Termination Control

A case where an incoming call is terminated at a wireless terminal will now be described.

Figure 21:
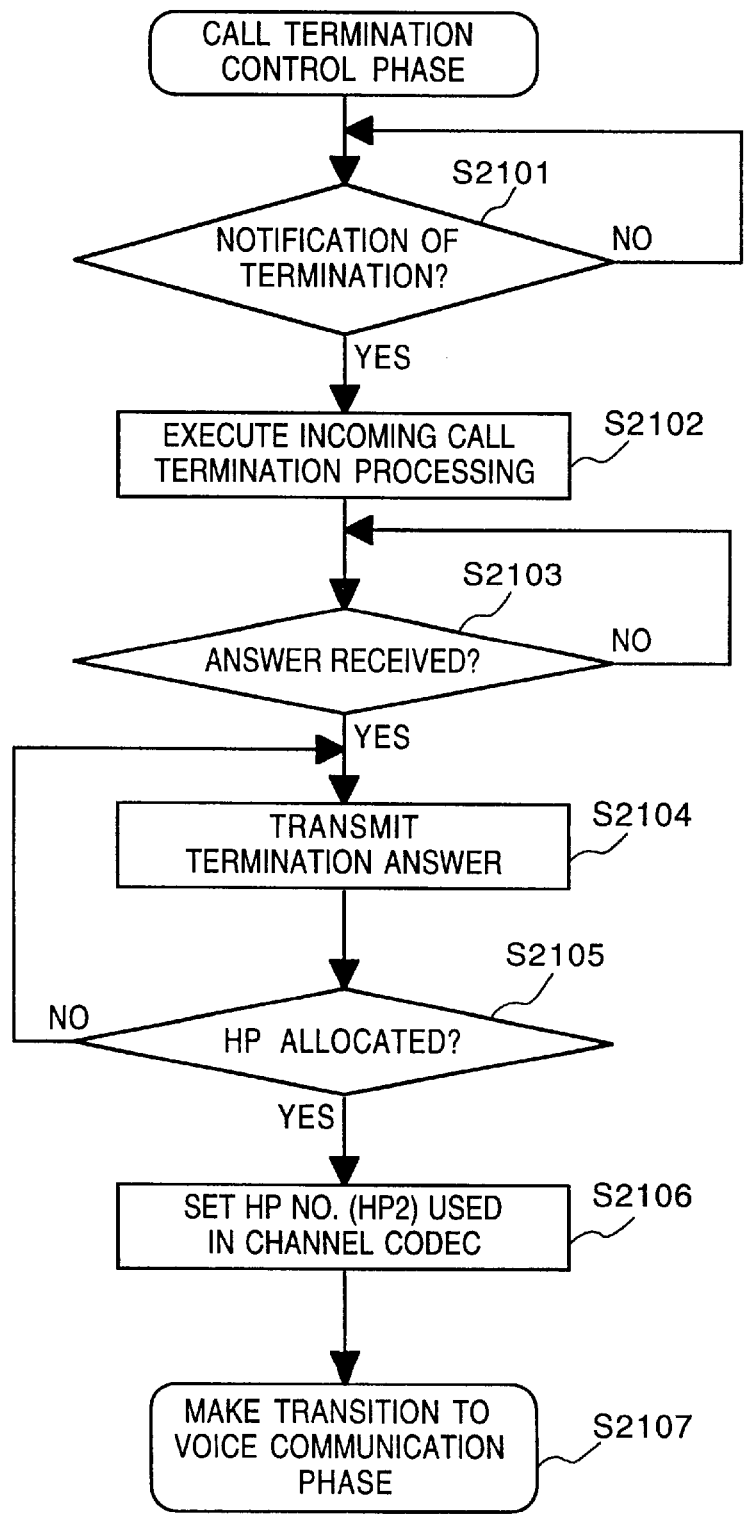
FIG. 21 is a flowchart of a terminating control operation performed by a wireless terminal according to the first embodiment.

FIG. 20 is a flowchart of the operation performed by the control station in a case where an incoming call from the public switched telephone network is terminated at the network control station, and FIG. 21 is a flowchart of operation performed by the wireless terminal in a case where an incoming call from the public switched telephone network is terminated at the network control station.

When an incoming call from the public switched telephone network is terminated at the network control station (at step S2001 in FIG. 20), the control station writes a call termination command to the LCCH register 310 of the channel codec 208, writes the address of the terminating wireless terminal to the destination address register 328, then sets the mode register 305 of the channel codec 208 to the LCCH transmission mode and notifies the terminating wireless terminal of the fact that there is an incoming call (S2002). The hopping pattern used in transmission of the LCCH data is the first hopping pattern, which is the same as that of the CNT channel.

The wireless terminal (a personal computer in this embodiment) that has received the termination command ("YES" at S2101) executes termination processing, such as issuance of an incoming call tone, to notify the user of the incoming call (S2102). When an answer corresponding to the incoming call is made by the user (S2103), the wireless terminal writes a termination answer command to the LCCH register 310 in the channel codec 208 in order to notify the control station of the fact that the incoming call has been answered, writes the address of the centralized control station to the destination address register, then sets the mode register 305 of the channel codec 208 to the LCCH transmission mode and notifies the centralized control station of the fact that the incoming call has been answered (S2104).

Upon receiving the termination answer command (S2003), the centralized control station notifies the answering personal computer of the hopping pattern used when data transmitted to the public telephone line or received from the public telephone line are exchanged between the personal computer and the centralized control station (S2004).

Here, with regard to the incoming call from the public telephone line, all data will be regarded as voice data and it will be assumed that the hopping pattern of which the personal computer is notified also is the second hopping pattern for the voice channel. The reason for this is that since all of the data sent from the public telephone line arrive upon being modulated as voice data, the data can be treated as voice data even if they are facsimile data or data from personal computer.

When notification of the hopping pattern used ends, the centralized control station makes a transition to the voice communication phase just as at the time of origination of the outgoing call (S2005).

If the termination answer command from the personal computer is not received at S2003, the control station judges that the personal computer is incapable of communicating and notifies the public telephone line of the fact that the personal computer is busy (S2006).

If the personal computer that has notified the centralized control station at S2104 that it has answered the incoming call has its hopping pattern allocated by the centralized control station ("YES" at S2105), the personal computer sets the hopping pattern number used by the voice communication channel and the channel used in the HP register 306 of the channel codec 208 and starts the operation of the ADPCM codec (S2106). The personal computer then undergoes a transition to the voice communication phase similar to that which prevailed when the outgoing call was originated.

If it is found at step S2105 that allocation of the hopping pattern has not been performed, then the personal computer transmits the termination answer command to the centralized control station again.

If the personal computer issues an origination request for data communication while it is performing communication in response to an incoming call from the public telephone line, the above-described origination control phase for data communication is carried out. Even if the personal computer is already performing data communication, it is capable of carrying out the above-described termination control phase if there is an incoming call.

Thus, as described above, communication using the control channel, the voice channel and the data channel is performed in accordance with hopping patterns that differ from one another. As a result, one wireless terminal can communicate simultaneously with a plurality of other wireless terminals having different hopping patterns.

Second Embodiment

A second embodiment of the present invention will now be described. The wireless communication system and wireless control unit of this embodiment have architectures identical with those of the wireless communication system and wireless control unit according to the first embodiment.

Figure 22:
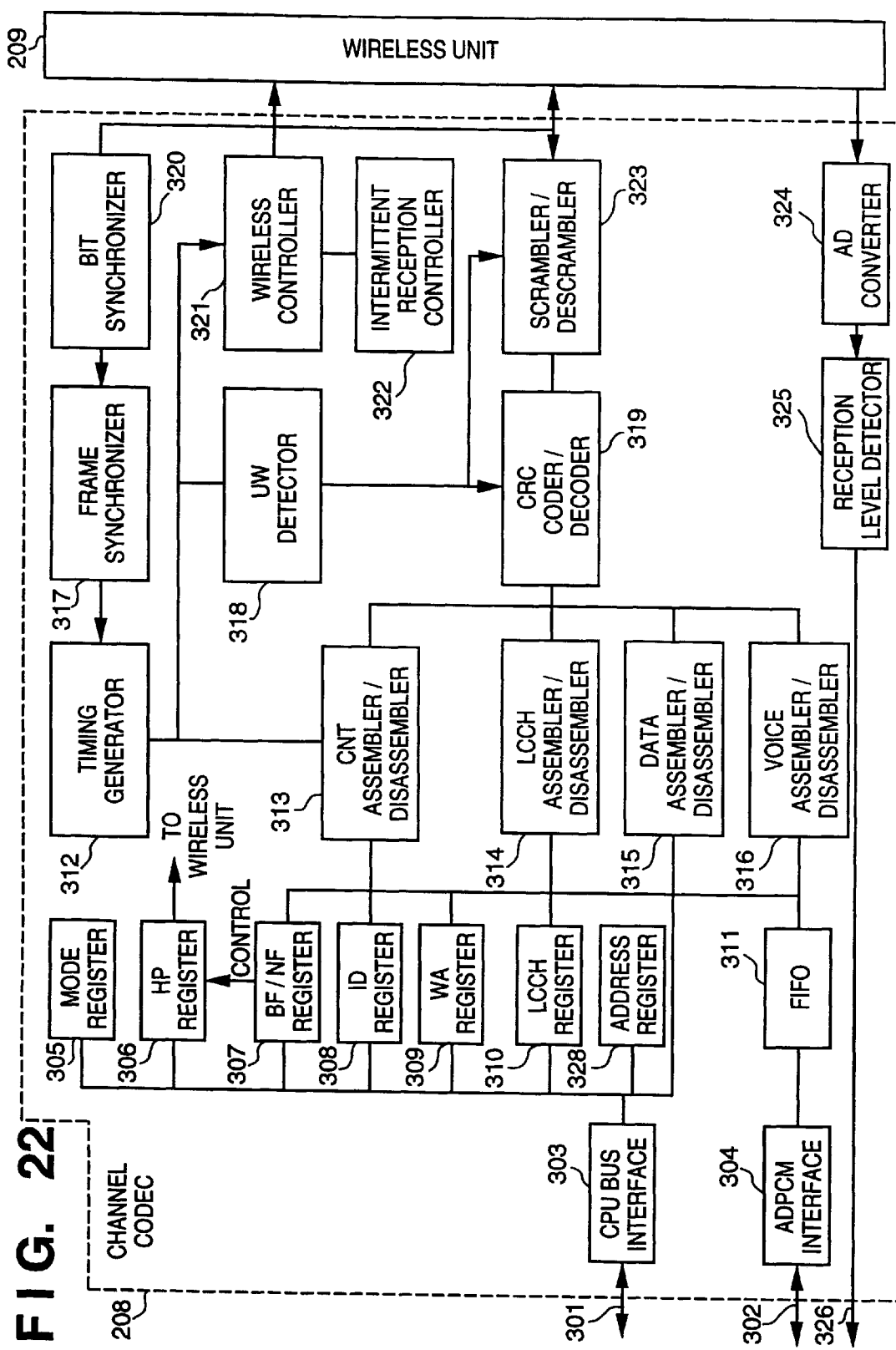
FIG. 22 is a block diagram showing the architecture of a channel codec according to a second embodiment of the invention.

FIG. 22 is a block diagram showing the architecture of a channel codec in a system according to the second embodiment of the invention. The codec includes an address register 328 for storing the address which is the destination of communication. The other components of this codec are the same as those in the channel codec of the first embodiment illustrated in FIG. 3.

FIGS. 23A–23E are diagrams showing the structures of wireless frames used in the system according to the second embodiment. The basic components are the same as those of the wireless frames used in the system according to the first embodiment. The difference between the first and second embodiments in terms of the wireless frame elements is that each channel of the wireless frames according to the second embodiment has a system ID (ID) for receiving only data from the centralized control station that belongs to the same system. By thus providing an ID portion for each channel, it is possible to prevent the system from accidentally receiving data transmitted by another system.

The concept of frequency hopping used in the system according to this embodiment and the hopping patterns are the same as those used in the system according to the first embodiment.

The basic operation of the wireless control unit according to this embodiment will be described.

Since each channel of the wireless frames in this embodiment is provided with the ID portion, as mentioned above, the wireless control unit performs the operation, described below, using this ID.

Figure 23:
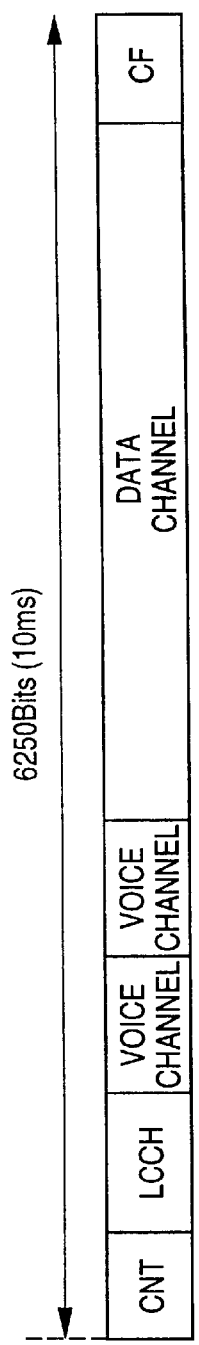
FIGS. 23A–23E are diagrams showing the structures of wireless frames according to the second embodiment.

In the LCCH channel shown in FIG. 23C, the CPU on the sending side uses the LCCH assembler/disassembler 314 to assemble the data that have been stored in the LCCH register 310 and the data in the ID register 308 within the channel codec 208. The assembled data are transmitted at the predetermined timing. On the receiving side, the received LCCH channel is disassembled by the LCCH assembler/disassembler 314. If and only if the received system ID matches the value that has been written in its own ID register 308, the receiving side stores the disassembled data in the LCCH register 310. Once this has been done, an interrupt is generated and applied to the CPU. In response to the interrupt, the CPU reads the data in the register.

With regard to the voice channel, the channel codec uses the voice assembler/disassembler 316 to assemble data that have entered via the ADPCM interface 304 and data in the ID register 308 and transmits the assembled data at the predetermined timing. Conversely, on the receiving side, the received voice channel is disassembled by the voice assembler/disassembler 316 at the predetermined timing and the results are outputted via the ADPCM interface 304, at the timing at which processing is performed in the ADPCM codec 207, only if the received system ID matches the value that has been stored in the receiving side's own ID register 308.

With regard to the data channel, the data are transmitted only if the CPU has requested data transmission. If data transmission has been requested, the CPU bus interface 303 of the channel codec 208 outputs a DMA request to the DMA controller (DMAC) 206 at the timing of every byte. When the DMAC 206 responds to the DMA request and data is written, the data is converted to a serial one by the data assembler/disassembler 315, the data is assembled together with the data in the ID register 308 and the resulting data are transmitted at the predetermined timing. Conversely, in a case where the data channel is received, the data assembler/disassembler 315 disassembles the data and, if the received system ID matches the value that has been written in the receiving side's own ID register 308, converts the data to parallel data. Operation from this point onward is the same as that of the first embodiment.

The operation of the system according to this embodiment will now be described. Here also it will be assumed that the network controller connected to the public telephone line functions as a centralized control station.

Voice Communication Control Operation

Figure 24:
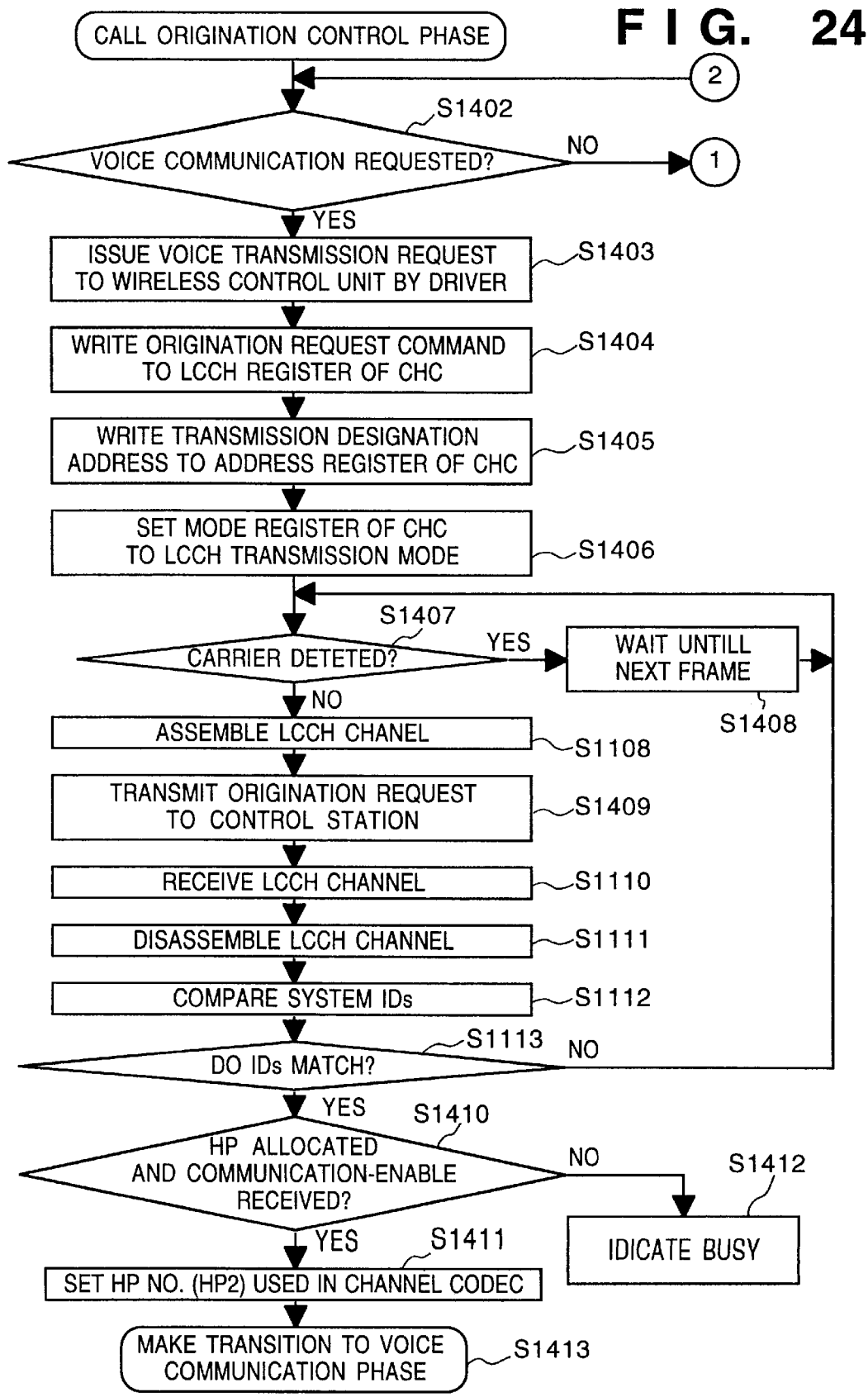
FIG. 24 is a flowchart showing a voice communication control operation according to the second embodiment.

FIG. 24 is a flowchart showing a voice communication control operation according to this embodiment. Processing steps identical with those of the voice communication control operation according to the first embodiment shown in FIG. 14 are designated by like step numbers and need not be described again. Further, processing following transition to the voice communication phase is the same as illustrated in FIG. 15.

In a case where a carrier is not detected at step S1407 in FIG. 24, it may be considered that another terminal is not using the LCCH channel. Accordingly, in this embodiment, the data in the LCCH register 310, the address register 328 and the ID register 308 are read out, the frame of the logical control channel is assembled (S1108) and transmission of data to the centralized control station is started (S1409).

When the LCCH channel is received on the side of the personal computer by way of the first hopping pattern (S1110), the LCCH assembler/disassembler 314 in the channel codec 208 disassembles the received LCCH frame (S1111). The system ID sent in the system ID portion and the system ID in the ID register of the channel codec are compared and it is determined whether the address sent in the transmission-destination address portion matches the address on the side of the personal computer (S1112). If the result is that the system IDs match and the address is that of the terminal on the receiving side ("YES" at S1113), then the ensuing data are received. In other words, the notification of call termination, the hopping pattern and allocation of the channel used are received (S1410).

When bit synchronization is established in the preamble section of the received voice data in the voice channel, the unique word is detected and the system ID matches the system ID in the ID address register 308 at the time that audio is received, descrambling is carried out. The descrambled data are decoded by the ADPCM codec 207 and the decoded data are outputted as a voice from the speaker of the handset.

Data Communication Control Operation

Figure 25:
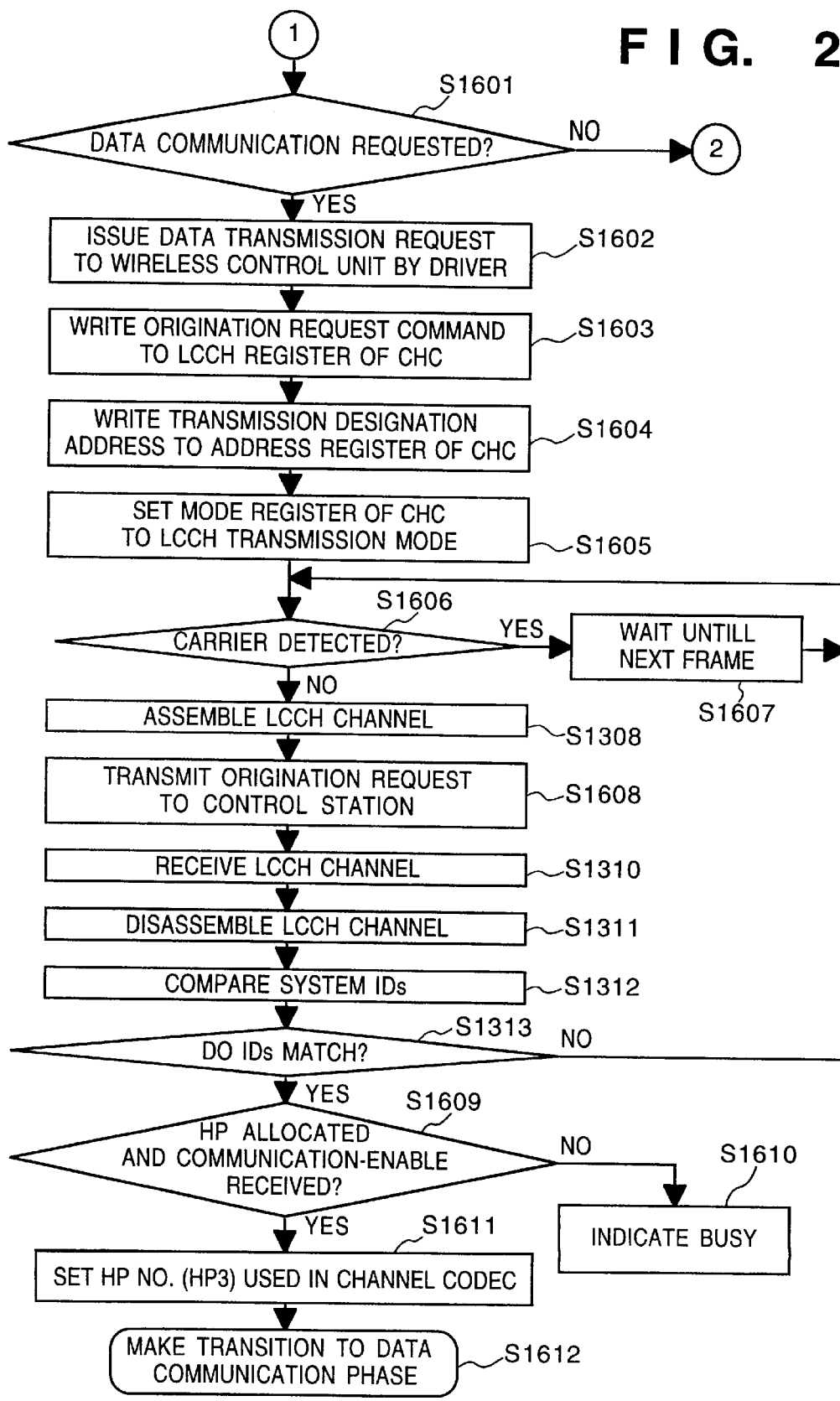
FIG. 25 is a flowchart showing a data communication control operation according to the second embodiment.
Figure 26:
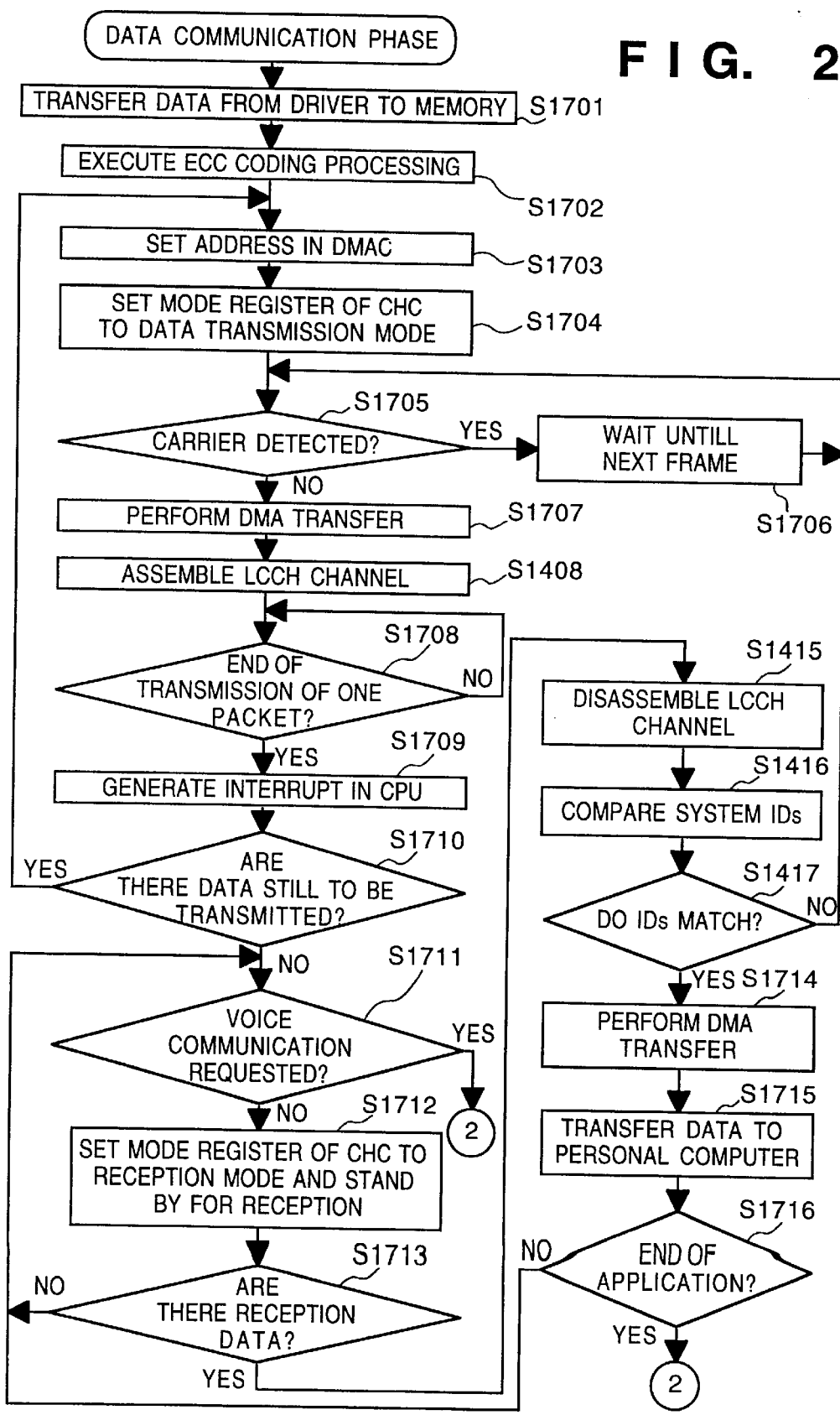
FIG. 26 is a flowchart showing a data communication operation according to the second embodiment.

FIGS. 25 and 26 are flowcharts showing a data communication control operation according to the second embodiment. Processing steps identical with those of the data communication control operation according to the first embodiment shown in FIGS. 16 and 17 are designated by like step numbers and need not be described again.

In a case where a carrier is not detected at step S1606 in FIG. 25, it may be considered that another terminal is not using the LCCH channel. Accordingly, the data in the LCCH register 310, the address register 328 and the ID register 308 are read out, the frame of the LCCH channel is assembled (S1308) and transmission of data to the centralized control station is started (S1608).

When the LCCH channel is received on the side of the personal computer by way of the first hopping pattern (S1310), the LCCH assembler/disassembler 314 in the channel codec 208 disassembles the received LCCH frame (S1311).

The system ID sent in the system ID portion and the system ID in the ID register of the channel codec are compared and it is determined whether the address sent in the transmission-destination address portion matches the address on the side of the personal computer (S1312). If the result is that the system IDs match and the address is that of the terminal on the receiving side ("YES" at S1313), then the ensuing data are received. In other words, the notification of call termination, the hopping pattern and allocation of the channel used are received (S1609).

When a transition is made to the data communication phase and a carrier is not detected at step S1705 in FIG. 26, then a DMA request is generated in one byte units in conformity with the timing of the data channel. Upon receiving the DMA request, the DMA controller transfers the data to the memory 205 of the channel codec 208 (S1707). The channel codec 208 adds the preamble, the unique word and the system ID in the ID register 308 onto the data, assembles the LCCH channel (S1408) and then scrambles the data and transmits the scrambled data (S1708).

If data are received ("YES" at S1713) after the mode register of the channel codec is set to the reception mode (S1712), the data assembler/disassembler disassembles the LCCH channel in the channel codec 208 (S1415). Bit synchronization is established in the preamble section, the unique word is detected and the system ID in the system ID portion is compared with the system ID in the ID register 308 (S1416). If the two system IDs match ("YES" at S1417), descrambling is carried out.

Operation in a case where data communication is requested during the time that voice communication is in progress is the same as that described in the first embodiment. However, when communication is carried out while changing over frequency in accordance with the three above-mentioned hopping patterns that have been stored in the HP register in the system according to this embodiment, the system ID in the ID register 308 is added on for every channel transmitted at the frequency to which the changeover has been made. Data are received on the receiving side only if the received system ID matches the system ID in the ID register.

Termination Control Operation

Call terminal control in the system according to this embodiment will now be described.

Figure 27:
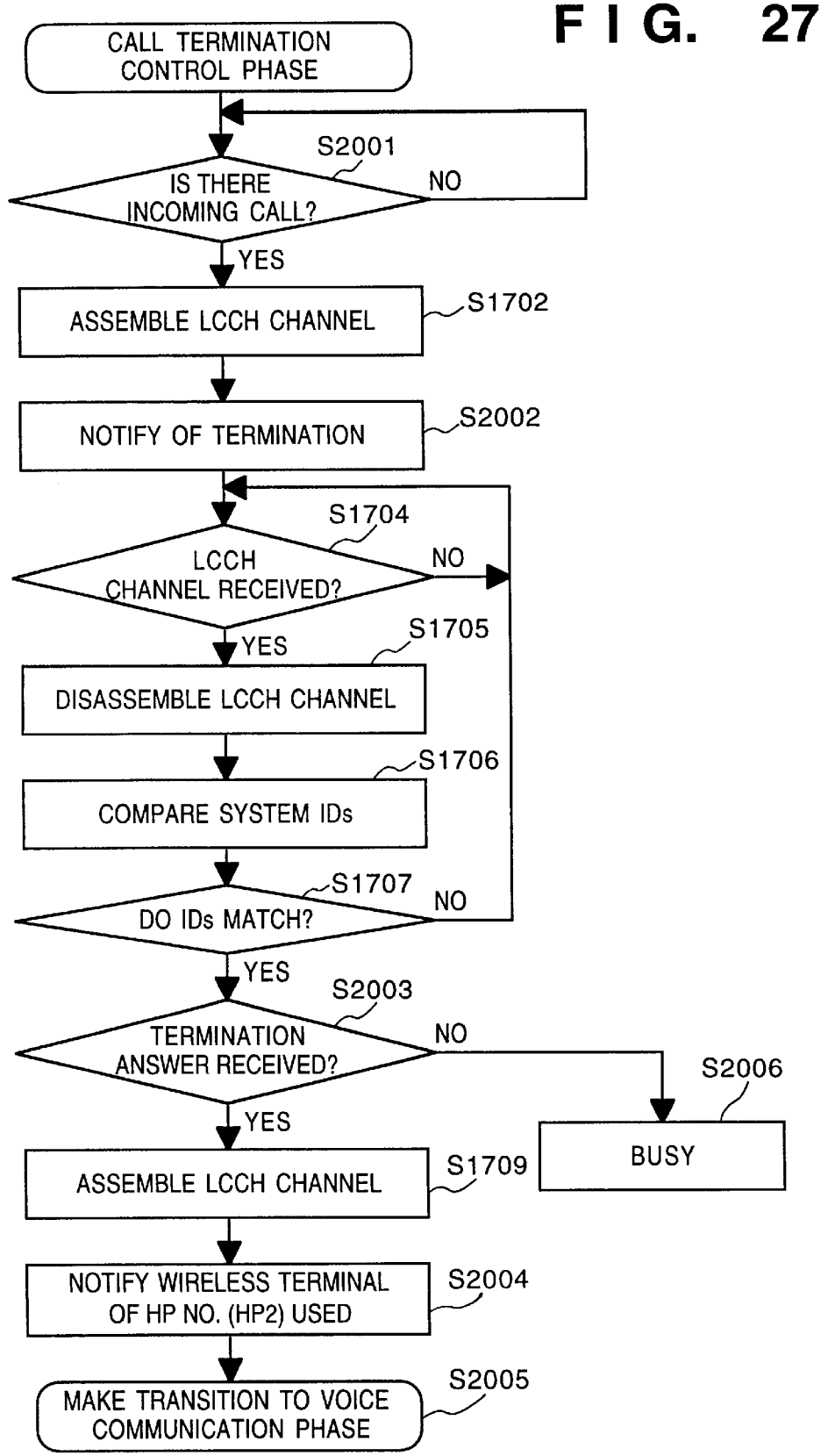
FIG. 27 is a flowchart showing a terminating control operation performed by the control station according to the second embodiment.
Figure 28:
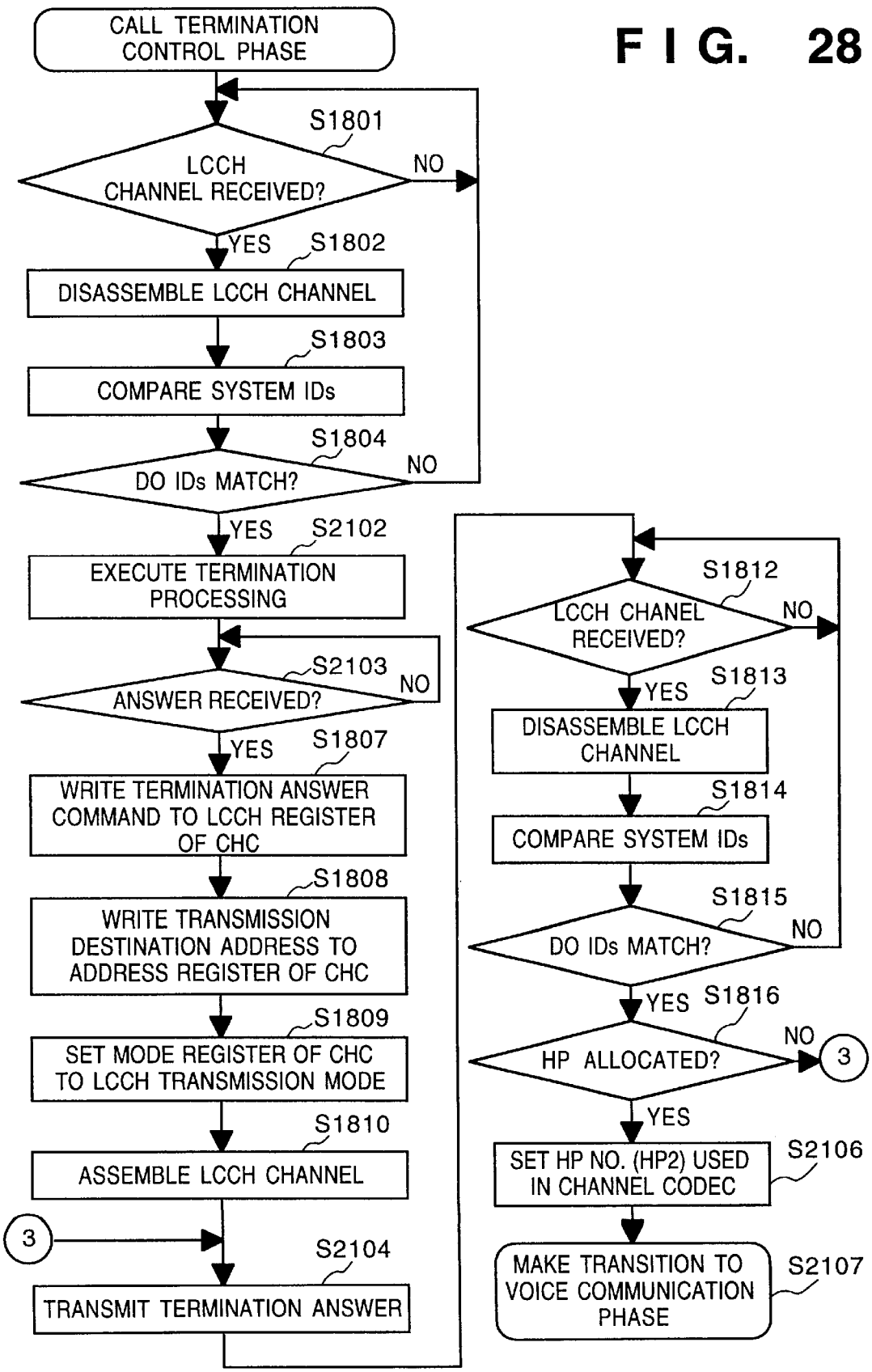
FIG. 28 is a flowchart of a terminating control operation performed by a wireless terminal according to the second embodiment.

FIG. 27 is a flowchart illustrating the control procedure performed by the control station when an incoming call is terminated, and FIG. 28 is a flowchart illustrating the control procedure performed by the wireless terminal when an incoming call is terminated. Processing steps in FIGS. 27 and 28 identical with those of the control procedure shown in FIGS. 20 and 21 are designated by like step numbers and need not be described again.

When an incoming call from the public telephone line is terminated at the network control station (S2001) in FIG. 27, the control station writes a call termination command to the LCCH register 310 of the channel codec 208, writes the address of the terminating wireless terminal to the destination address register 328, then sets the mode register 305 of the channel codec 208 to the LCCH transmission mode. The control station reads the call termination command out of the LCCH register 310, reads the address of the terminating wireless terminal out of the address register 328, reads the system ID out of the ID register 308 and assembles the LCCH channel (S1702). The control station gives notification of the incoming call by transmitting the LCCH channel to the terminating wireless terminal (S2002).

The wireless terminal (a personal computer in this embodiment) that has received the above-mentioned LCCH channel (S1801 in FIG. 28) disassembles the LCCH channel by the LCCH assembler/disassembler 314 in the channel codec 208 (S1802) and compares the system ID in the system ID portion and the system ID in the ID register 308 (S1803). If the two system IDs match ("YES" at S1804), then the ensuing data are received and the personal computer executes termination processing, such as issuance of an incoming call tone, to notify the user of the incoming call (S2102). When an answer corresponding to the incoming call is made by the user ("Yes" at S2103), the personal computer writes a termination answer command to the LCCH register 310 in the channel codec 208 in order to notify the control station of the fact that the incoming call has been answered (S1807), writes the address of the centralized control station to the destination address register (S1808), then sets the mode register 305 of the channel codec 208 to the LCCH transmission mode (S1809). The personal computer reads the termination answer command out of the LCCH register 310, reads the address out of the address register 328, reads the system ID out of the ID register 308 and assembles the LCCH channel (S1810). By transmitting this channel, the personal computer notifies the centralized control station of the fact that the incoming call has been answered (S2104).

Upon receiving the LCCH channel ("YES" at S1704), the centralized control station disassembles the LCCH channel by the LCCH assembler/disassembler 314 in the channel codec 208 (S1705) and compares the system ID in the system ID portion and the system ID in the ID register 308 (S1706). If the two system IDs are found to match ("YES" at S1707), then the ensuing data are received, whereby the termination answer command is received ("YES" at S1708). In order to notify the answering personal computer of the hopping pattern used when data transmitted to the public telephone line or received from the public telephone line are exchanged between the personal computer and the centralized control station, the LCCH channel to which the system ID, etc. have been added on is assembled again (S1709) and this is transmitted to the personal computer (S2004).

When notification of the hopping pattern used ends, the centralized control station makes a transition to the voice communication phase just as at the time of origination of the outgoing call (S2005).

If the personal computer that has notified the centralized control station that it has answered the incoming call subsequently receives the LCCH channel ("YES" at step S1812 in FIG. 28), the LCCH channel is disassembled by the LCCH assembler/disassembler 314 in the channel codec 208 (S1813). The system ID in the system ID portion is then compared with the system ID in the ID register 308 (S1814). If these system IDs match ("YES" at step S1815), then the ensuing data are received.

When the hopping pattern used is allocated by the centralized control station in accordance with the data received ("YES" at S1816), the second hopping pattern used in the voice communication channel and the channel used are set in the HP register 306 of the channel codec 208 and operation of the ADPCM codec is started (S2106). The personal computer then undergoes a transition to the voice communication phase similar to that which prevailed when the outgoing call was originated (S2107).

If it is found at step S1816 that allocation of the hopping pattern has not been performed, then the program returns to step S2104 and the personal computer transmits the termination answer command to the centralized control station again.

Thus, as described above, the system ID is added onto the control channel, voice channel and data channel in which communication is performed at frequencies that differ from one another. Therefore, even if another system is performing communication at the same frequency, data will no longer be received accidentally.

Thus, it is possible to prevent the accidental reception of data from another system even in a frequency-hopping communication apparatus in which frequency is changed over in the middle of a communication frame.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication apparatus for performing time-division multiplexed communication of a plurality of items of information using frequency hopping, comprising:

assembling means for assembling a communication frame with a plurality of items of information;

allocating means for allocating a plurality of different hopping patterns for each of the plurality of items of information which constitute the communication frame; and communication means for performing communication of the plurality of items of information which constitute the communication frame in accordance with hopping patterns allocated by said allocating means.

2. The apparatus according to claim 1, wherein the plurality of items of information include control information and at least one item of communication information, and said allocating means allocates different hopping patterns for the control information and the communication information.

3. The apparatus according to claim 2, wherein the communication information is composed of voice information and/or data information.

4. The apparatus according to claim 2, wherein the plurality of items of information are items of information communicated to a plurality of other wireless communication apparatus simultaneously.

5. The apparatus according to claim 2, wherein allocation of a hopping pattern regarding the control information is performed when power is introduced to the wireless communication apparatus.

6. The apparatus according to claim 2, wherein notification of a hopping pattern regarding the communication information is given using the control information.

7. The apparatus according to claim 1, further comprising multiplexing means for multiplexing identification information with each items of the plurality of items of information which constitute the communication frame, said identification information being for identifying communication with another wireless communication apparatus.

8. The apparatus according to claim 1, wherein said wireless communication apparatus includes frame assembling means for time-division multiplexing said plurality of items of information so as to assemble said information into a communication frame.

9. A wireless communication method utilized in a wireless communication apparatus which performs time-division multiplexed communication of a plurality of items of information using frequency hopping, comprising:

a step of assembling a communication frame with plurality of items of information;

a step of allocating a plurality of different hopping patterns for each of the plurality of items of information which constitute the communication frame; and a communication step of performing communication of the plurality of items of information which constitute the communication frame, in accordance with hopping patterns allocated in said allocating step.

10. The method according to claim 9, wherein the plurality of items of information include control information and at least one item of communication information, and said allocating step includes allocating different hopping patterns for said control information and said communication information.

11. The method according to claim 10, wherein the communication information is composed of voice information and/or data information.

12. The method according to claim 10, wherein the plurality of items of information are items of information communicated to a plurality of other wireless communication apparatus.

13. The method according to claim 10, wherein allocation of a hopping pattern regarding the control information is performed when power is introduced to the wireless communication apparatus.

14. The method according to claim 10, wherein notification of a hopping pattern regarding the communication information is given using the control information.

15. The method according to claim 9, further comprising a multiplexing step of multiplexing identification information with each items of the plurality of items of information which constitute the communication frame, said identification information being for identifying communication with another wireless communication apparatus.

* * * * *

UNITED STATES PATENT AND TRADEMARK OFFICE
CERTIFICATE OF CORRECTION

PATENT NO. : 5,907,545

DATED : May 25, 1999

INVENTOR(S) : YASUYUKI ARAI ET AL.

Page 1 of 3

It is certified that error appears in the above-identified patent and that said Letters Patent is hereby corrected as shown below:

ON THE TITLE PAGE:

[56] REFERENCES CITED, U.S. PATENT DOCUMENTS

"5,408,496" should read --5,480,496--.

[76] INVENTORS

"Yasuyuki Arai, 1-4-13-402, Kajigaya, Takatsu-ku, Kawasaki-shi, Kanagawa-ken, Japan; Michihiro Izumi, c/o Canon Kabushikii Kaisha, 30-2, Shimomaruko 3-chome, Ohta-ku, Tokyo, Japan" should read --Yasuyuki Arai, Kawasaki; Michihiro Izumi, Yokohama; both of Japan--.

[57] ABSTRACT

Line 4, "patters" should read --patterns--.

UNITED STATES PATENT AND TRADEMARK OFFICE
CERTIFICATE OF CORRECTION

PATENT NO. : 5,907,545

DATED : May 25, 1999

INVENTOR(S) : YASUYUKI ARAI ET AL.

It is certified that error appears in the above-identified patent and that said Letters Patent is hereby corrected as shown below:

FIG. 12

"REQUENCY" should read --FREQUENCY--.

FIG. 24

"DETETED" should read --DETECTED--.

COLUMN 6

Line 25, "in" (second occurrence) should be deleted.

COLUMN 10

Line 50, "communication enable" should read --communication-enable--.

COLUMN 19

Line 31, "apparatus" should read --apparatuses--.

UNITED STATES PATENT AND TRADEMARK OFFICE
CERTIFICATE OF CORRECTION

PATENT NO. : 5,907,545

DATED : May 25, 1999

INVENTOR(S) : YASUYUKI ARAI ET AL.

It is certified that error appears in the above-identified patent and that said Letters Patent is hereby corrected as shown below:

<u>COLUMN 20</u>

Line 31, "apparatus" should read --apparatuses--.

Signed and Sealed this

Eleventh Day of July, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,907,545
DATED     : May 25, 1999
INVENTOR(S) : Yasuyuki Arai, et al It is certified that error appears in the above-identified patent and that said Letters Patent is hereby corrected as shown below:

On title page, add item
[73] ASSIGNEE

Insert --[73] Assignee: Canon Kabushiki Kaisha, Tokyo, Japan--.

Signed and Sealed this

Eighth Day of August, 2000

Attest:

Q. TODD DICKINSON

*Attesting Officer*      *Director of Patents and Trademarks*